(12) United States Patent
Choi et al.

(10) Patent No.: US 10,809,135 B2
(45) Date of Patent: Oct. 20, 2020

(54) DEVICE FOR DETECTING TEMPERATURE AND ELECTRONIC DEVICE HAVING THE SAME

(71) Applicant: SAMSUNG ELECTRONICS CO., LTD., Suwon-si, Gyeonggi-do (KR)

(72) Inventors: Seung Bum Choi, Suwon-si (KR); Joo Hyun Kim, Seoul (KR); Soo Hyun Park, Suwon-si (KR); Doo Sun Yoon, Hwaseong-si (KR); Min Woo Yoo, Osan-si (KR); Jong Chul Choi, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 237 days.

(21) Appl. No.: 15/883,340

(22) Filed: Jan. 30, 2018

(65) Prior Publication Data

US 2018/0217006 A1     Aug. 2, 2018

(30) Foreign Application Priority Data

Feb. 2, 2017 (KR) .......................... 10-2017-0015083

(51) Int. Cl.

| | |
|---|---|
| *G01K 11/00* | (2006.01) |
| *G01K 5/52* | (2006.01) |
| *H01M 10/42* | (2006.01) |
| *G01K 13/00* | (2006.01) |
| *G01K 7/22* | (2006.01) |
| *H01M 10/48* | (2006.01) |

(52) U.S. Cl.
CPC ............. *G01K 5/52* (2013.01); *G01K 7/223* (2013.01); *G01K 13/00* (2013.01); *H01M 10/4285* (2013.01); *H01M 10/486* (2013.01); *H01M 2200/10* (2013.01); *H01M 2220/30* (2013.01)

(58) Field of Classification Search
CPC ....... H01M 10/486; H01M 2010/4271; H01M 2200/10; G01K 13/00; G01K 1/14; G01K 1/024; G01K 2205/00; G01K 7/16; G01K 1/143; G01K 1/08; G01K 11/06; G01K 17/00; G01K 7/425
USPC ....... 374/185, 120, 141, 152, 160, 170, 208; 340/870.17
See application file for complete search history.

(56) References Cited

U.S. PATENT DOCUMENTS

| | | | | |
|---|---|---|---|---|
| 4,762,429 | A * | 8/1988 | Fujikawa | G01K 13/002 340/636.15 |
| 7,059,769 | B1 * | 6/2006 | Potega | G01R 31/3835 374/185 |
| 7,104,684 | B2 * | 9/2006 | Felder | G01K 7/22 374/178 |

(Continued)

FOREIGN PATENT DOCUMENTS

| | | |
|---|---|---|
| KR | 10-2005-0070192 | 7/2005 |
| KR | 10-2008-0113263 | 12/2008 |

*Primary Examiner* — Gail Kaplan Verbitsky
(74) *Attorney, Agent, or Firm* — Nixon & Vanderhye P.C.

(57) ABSTRACT

An electronic device is provided. The electronic device includes a substrate, a coil unit comprising a coil disposed on a specified area of the substrate and configured to transmit or receive a signal, a first terminal, a second terminal, and a temperature sensor configured to detect temperature. The temperature sensor has a wire form and is disposed between the first terminal and the second terminal along at least part of a peripheral area of the substrate.

11 Claims, 18 Drawing Sheets

(56) References Cited

U.S. PATENT DOCUMENTS

| | | | | |
|---|---|---|---|---|
| 7,374,843 B2* | 5/2008 | Adachi | ............... | B01D 65/102 |
| | | | | 374/57 |
| 7,521,897 B2 | 4/2009 | Wolf et al. | | |
| 8,092,081 B2* | 1/2012 | Hermann | ............... | G01K 3/005 |
| | | | | 320/150 |
| 9,847,658 B2* | 12/2017 | Kuhlmann | ............ | H02J 7/0026 |
| 10,484,526 B2* | 11/2019 | Lee | ......................... | G06F 21/44 |
| 10,557,757 B2* | 2/2020 | Ju | ........................... | G01K 1/14 |
| 2002/0079310 A1* | 6/2002 | Siefert | ..................... | G01K 7/42 |
| | | | | 219/494 |
| 2007/0222419 A1 | 9/2007 | Wolf et al. | | |
| 2009/0097513 A1* | 4/2009 | Grove | ................. | H01S 5/06825 |
| | | | | 372/25 |
| 2013/0058377 A1* | 3/2013 | Rocci | ..................... | G01R 31/40 |
| | | | | 374/152 |
| 2013/0182745 A1* | 7/2013 | Hertel | ..................... | G01K 1/14 |
| | | | | 374/185 |
| 2014/0334526 A1* | 11/2014 | Butera | .................. | G01K 3/005 |
| | | | | 374/188 |
| 2015/0010040 A1* | 1/2015 | Ito | ......................... | G01K 1/024 |
| | | | | 374/152 |
| 2015/0145467 A1* | 5/2015 | Zhu | ........................ | G01K 13/00 |
| | | | | 320/107 |
| 2018/0260094 A1* | 9/2018 | Kim | ..................... | G06F 1/1626 |
| 2019/0086284 A1* | 3/2019 | MacNeil | ................. | G01K 13/00 |
| 2019/0101135 A1* | 4/2019 | Pacilli | ................. | F04D 25/0633 |

* cited by examiner

DEVICE FOR DETECTING TEMPERATURE AND ELECTRONIC DEVICE HAVING THE SAME

CROSS-REFERENCE TO RELATED APPLICATION

This application is based on and claims priority under 35 U.S.C. § 119 to a Korean patent application filed on Feb. 2, 2017 in the Korean Intellectual Property Office and assigned Serial number 10-2017-0015083, the disclosure of which is incorporated by reference herein in its entirety.

TECHNICAL FIELD

The present disclosure relates generally to a device for detecting temperature and an electronic device having the same.

BACKGROUND

An electronic device, such as a smartphone, may include high-performance electronic components with high hardware specifications to perform specified functions at high speed. As hardware specifications become higher, the amount of power consumed by the electronic components may increase, and the capacity of a battery that supplies power to the electronic components may also increase.

Battery power management is critical to an electronic device, such as a mobile electronic device, which has a limited battery capacity. Accordingly, the electronic device may manage the battery residual quantity, the residual life-time, the maximum allowable input/output power, or the voltage balancing of the battery by using status information of the battery.

Meanwhile, the battery may abnormally generate heat due to an external shock or an internal cause, for example, a failure in voltage balancing. On account of the abnormal heat generation of the battery, elements in a circuit may malfunction, and damage may lead to accidents, such as explosion or ignition. Accordingly, to detect heat abnormally generated by the battery, the electronic device may include a battery protection circuit (e.g., a protection circuit module (PCM)) or a thermistor disposed on a specific circuit part around the battery (e.g., a part on a printed circuit board that is adjacent to the battery).

However, since the thermistor is disposed in a specific area around the battery to detect temperature of only a narrow area of the battery, the electronic device in the related art may not detect heat suddenly generated from a local area of the battery around which there is no thermistor. Furthermore, in the case where the number of thermistors is increased to reduce a dead zone in which temperature is not detected, the number of contact parts for contact with a printed circuit board may also be increased, or the thickness of the electronic device may be increased depending on the positions where the thermistors are located, which may cause spatial loss.

SUMMARY

Example aspects of the present disclosure address at least the above-mentioned problems and/or disadvantages and provide at least the advantages described below. Accordingly, an example aspect of the present disclosure is to provide a method for detecting temperature of a battery through a temperature sensor having a wire form and disposed adjacent to at least one surface of the battery, and an electronic device supporting the same.

In accordance with an example aspect of the present disclosure, an electronic device includes a substrate, a coil disposed on a specified area of the substrate and configured to transmit or receive a signal, a first terminal, a second terminal, and a temperature sensor configured to detect temperature. The temperature sensor is disposed in a wire form between the first terminal and the second terminal along at least part of a peripheral area of the substrate.

In accordance with another example aspect of the present disclosure, an electronic device includes a housing, a battery disposed inside the housing, a printed circuit board disposed inside the housing, wherein a processor is mounted on the printed circuit board, a temperature sensor having a wire form and disposed adjacent to at least one surface of the battery and configured to detect temperature of the battery, circuitry electrically connected with the printed circuit board and configured to measure the detected temperature, and at least one contact terminal configured to electrically connect the temperature sensor and the circuitry.

According to embodiments disclosed herein, a temperature sensor having a wire form may be disposed adjacent to one surface of a battery, thereby reducing a dead zone in which temperature is not detected.

In addition, the present disclosure may provide various effects and advantages that are directly or indirectly recognized.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein.

Throughout the drawings, it should be noted that like reference numbers are used to depict the same or similar elements, features, and structures.

DETAILED DESCRIPTION

Figure 1:
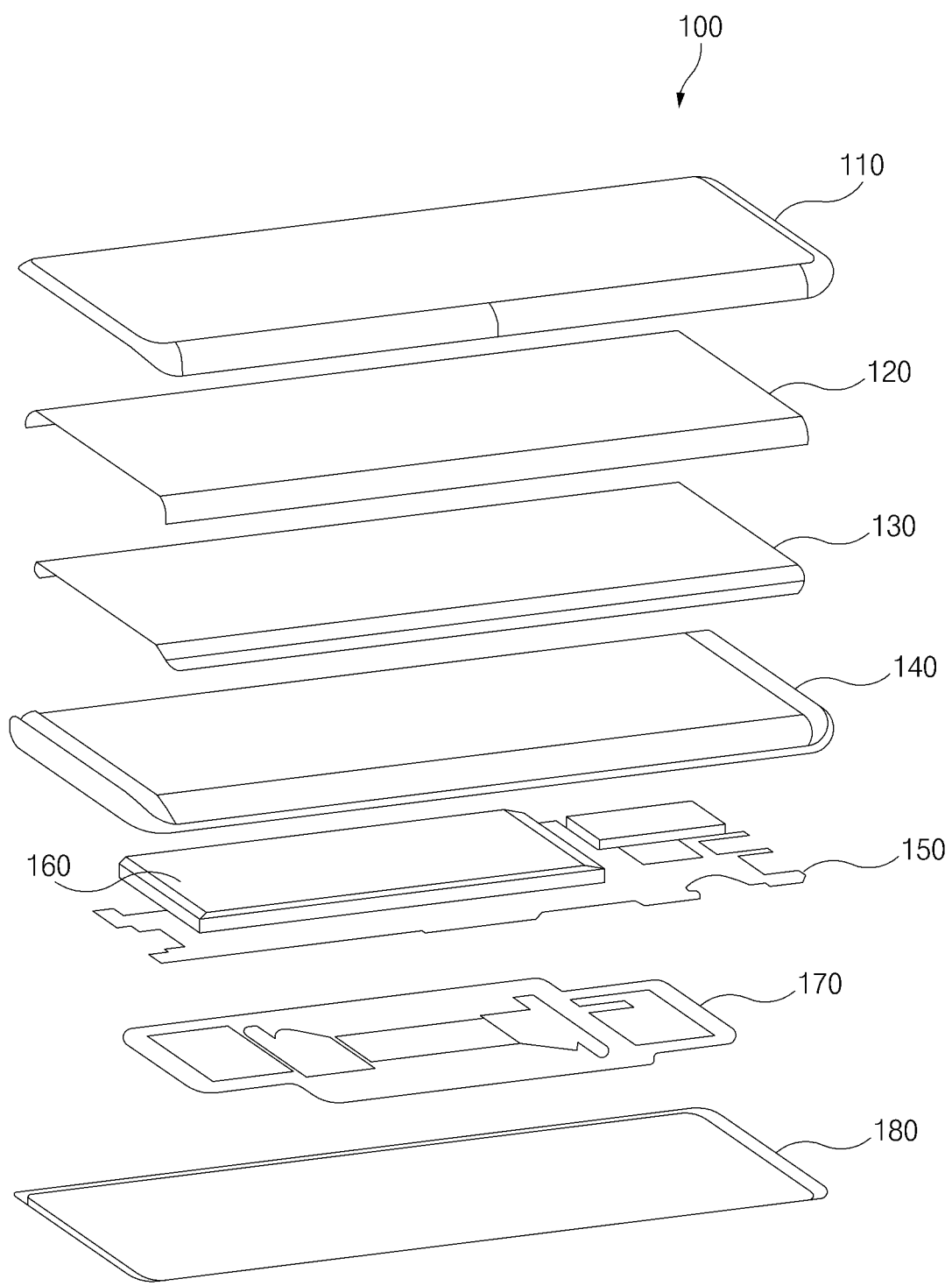
FIG. 1 is an exploded perspective view illustrating an example electronic device according to an example embodiment of the present disclosure.

Hereinafter, various example embodiments of the present disclosure are disclosed with reference to the accompanying drawings. However, the present disclosure is not limited by the various embodiments of the present disclosure to a specific embodiment and the present disclosure covers all modifications, equivalents, and/or alternatives of the present disclosure provided they come within the scope of the appended claims and their equivalents. With respect to the descriptions of the accompanying drawings, like reference numerals refer to like elements.

The terms and words used in the following description and claims are not limited to the bibliographical meanings, but, are merely used to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to modifying various different elements of various embodiments of the present disclosure, but do not limit the elements. For instance, "a first user device" and "a second user device" may indicate different users regardless of order or importance. For example, a first component may be referred to as a second component and vice versa without departing from the scope and spirit of the present disclosure.

In various embodiments of the present disclosure, when a component (for example, a first component) is referred to as being "operatively or communicatively coupled with/to" or "connected to" another component (for example, a second component), the component may be directly connected to the other component or connected through another component (for example, a third component). In various embodiments of the present disclosure, when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may refer, for example, and without limitation, to a dedicated processor (for example, an embedded processor) for performing a corresponding operation or a general purpose processor (for example, a central processing unit (CPU) or application processor (AP)), or the like, for performing corresponding operations by executing at least one software program stored in a memory device.

Terms used in various embodiments of the present disclosure are used to describe certain embodiments of the present disclosure, but are not intended to limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit), or the like, but is not limited thereto.

In some various embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ or PlayStation™), an electronic dictionary, an electronic key, a camcorder, or an electronic picture frame, or the like, but is not limited thereto.

In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like), or the like, but is not limited thereto.

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like), or the like, but is not limited thereto. An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in greater detail with reference to the accompanying drawings. The term "user" used herein may refer to a person who uses an electronic device or may refer to a device (e.g., an artificial intelligence electronic device) that uses an electronic device.

FIG. 1 is an exploded perspective view illustrating an example electronic device according to an example embodiment of the present disclosure.

The electronic device 100 may consistently or periodically detect a temperature change of a battery 160 to prevent and/or reduce other elements of the electronic device 100, as well as the battery 160, from malfunctioning due to heat abnormally generated by the battery 160. Furthermore, the electronic device 100 may limit some functions of the electronic device 100 if the temperature of the battery 160 is higher than or equal to a specified value (e.g., a threshold), or the electronic device 100 may adjust charging current of the battery 160 or may shut off power supplied to the battery 160 if the temperature of the battery 160 is higher than or equal to the specified value while the battery 160 is being charged.

Referring to FIG. 1, the electronic device 100 for performing the above-described functions may include a front cover 110, an adhesive layer 120, a display 130, a bracket (or housing) 140, a printed circuit board 150, the battery 160, an antenna unit (e.g., including an antenna) 170, and a rear cover 180. However, a configuration of the electronic device 100 is not limited thereto. According to various embodiments, the electronic device 100 may not include at least one of the aforementioned elements and may further include at least one other element.

The front cover 110 may form the front (and lateral) exterior of the electronic device 100. According to an embodiment, at least part of a periphery of the front cover 110 may be formed in a curved surface form. The front cover 110 may be coupled with the bracket 140 and/or the rear cover 180, with a space inside the electronic device 100 in which at least one element of the electronic device 100 is received. The front cover 110 may have at least one area formed of a transparent material (e.g., glass), and a screen output on the display 130 may be displayed to the outside through the transparent area of the front cover 110.

The adhesive layer 120 may be disposed between the front cover 110 and the display 130 to attach the front cover 110 to the display 130. Furthermore, the adhesive layer 120 may couple the front cover 110 with the bracket 140 and/or the rear cover 180.

The display 130 may display various types of contents (e.g., text, an image, a video, an icon, a symbol, and the like) to a user. The display 130 may include, for example, a liquid crystal display (LCD), a light-emitting diode (LED) display, an organic light-emitting diode (OLED) display, a microelectromechanical systems (MEMS) display, or an electronic paper display, or the like, but is not limited thereto. According to an embodiment, the display 130 may include a touch screen and may receive, for example, a touch input, a gesture input, a proximity input, or a hovering input using an electronic pen or a part of the user's body. In another example, the display 130 may include a flexible display. For example, at least one area of the display 130 may be bent. In FIG. 1, the display 130 has an outer periphery, at least one area of which has a curved surface form.

The display 130 may be implemented with a plurality of layers. According to an embodiment, the display 130 may include a touch detection layer and a display layer. However, a configuration of the display 130 is not limited thereto. According to various embodiments, the display 130 may further include a pressure detection layer (e.g., a pressure sensor) for detecting external pressure applied thereto and converting the detected pressure into an electrical signal that is to be used in measurement or control, a fingerprint recognition layer (e.g., a fingerprint recognition sensor) for identifying the user's fingerprint, or a heat shield layer (e.g., a heat sink plate) for blocking heat radiating from the display 130 or other elements of the electronic device 100.

The touch detection layer may detect contact or access of a touch object (e.g., an electronic pen or a part of the user's body). The touch detection layer may include, for example, a touch sensor. The touch detection layer may detect the contact or access of the touch object by using a pressure sensing technique, a resistance sensing technique, a capacitive sensing technique, an infrared sensing technique, a sound-wave sensing technique, a light sensing technique, or an electromagnetic induction technique.

According to an embodiment, the touch detection layer may have a panel form. For example, a capacitive touch detection layer may have a panel form in which detection electrodes formed of a conductive material, such as indium thin oxide (ITO) or a metal mesh, are arranged in horizontal and vertical directions to form a grid structure. Accordingly, the touch detection layer may detect a touch position by using a capacitance change occurring as a touch object contacts or accesses the detection electrodes.

The display layer may display a screen through color development of display components. According to an embodiment, the display layer may have a panel form. The display layer may have a different structure and shape depending on a color development method. For example, the display layer may include a polymer layer, a plurality of display components arranged on one surface of the polymer layer, and at least one conductive line electrically connected with the display components.

The polymer layer may include polyimide. The plurality of display components may be arranged in a matrix form on the surface of the polymer layer to form pixels of the display layer. The plurality of display components may include a fluorescent material or an organic fluorescent material that is able to represent a color. For example, the plurality of display components may include an organic light-emitting diode (OLED). The conductive line may form at least one gate signal line and at least one data signal line. According to one embodiment, a plurality of gate signal lines and a plurality of data signal lines may be arranged in a matrix form, and the plurality of display components may be disposed adjacent to the points where the signal lines cross one another and may be electrically connected to the signal lines.

The display layer may be connected with a display control module (e.g., a display driver IC (DDI)). The display control module may be electrically connected with the conductive line. The display control module may include a driver IC for providing a driving signal and an image signal to the display layer or a timing controller (T-con) for controlling the driving signal and the image signal. The driver IC may include a gate driver IC for sequentially selecting the gate signal lines to apply a scan signal (or a driving signal) and a data driver IC (or a source driver IC) for applying an image signal to the data signal lines. According to an embodiment, if the gate driver IC selects a gate signal line and applies a scan signal to the gate signal line to change the corresponding display component to an activated state, the data driver IC may apply an image signal to the corresponding display component through a data signal line. The timing controller may control transmission time of a signal transmitted to the driver IC to prevent a difference in display time of a screen.

The bracket 140 may provide a space in which at least a part (e.g., the display 130) of elements included in the electronic device 100 is mounted. The bracket 140 may include an insulating material, and an adhesive material may be coated, or an adhesive layer may be provided, on an area of the bracket 140 to fix an element of the electronic device 100 that is mounted on the bracket 140. According to an embodiment, the display 130 may be mounted on a front surface of the bracket 140, and the front cover 110 may be fastened to the bracket 140 and/or the rear cover 180 to cover at least part of the front surface of the bracket 140.

According to an embodiment, the bracket 140 may include at least one opening. An element of the electronic device 100 that is mounted on the bracket 140 may be electrically connected with the printed circuit board 150 through the at least one opening formed in the bracket 140. For example, a circuit line connected to the display 130 may be connected with the printed circuit board 150 through the opening.

The printed circuit board 150 may be disposed on a lower layer of the bracket 140. Various types of electronic components may be mounted on the printed circuit board 150. For example, at least one electronic component or a circuit line may be mounted on the printed circuit board 150. At least some of the electronic components mounted on the printed circuit board 150 may be electrically connected together. The electronic components may include, for example, a processor, a memory, a communication module (e.g., a communication circuit), a function module (e.g., a camera or a speaker), and the like.

The processor may include various processing circuitry and perform operations or data processing associated with control and/or communication of at least one other element of the electronic device 100. The processor may drive, for example, an operating system or an application program to control a plurality of hardware or software elements connected to the processor and may perform various types of data processing or operations. The processor may include various processing circuitry, such as, for example, and without limitation, one or more of a central processing unit, an application processor (AP), and a communication processor (CP), or the like. According to an embodiment, the processor may be implemented with a system on chip (SoC).

According to an embodiment, if the temperature of the battery 160 is higher than or equal to a specified value, the processor may limit the function of at least one other element connected with the processor. Alternatively, if the temperature of the battery 160 is higher than or equal to the specified value while the battery 160 is being charged, the processor may adjust the charging current of the battery 160 (e.g., the amount of current applied to the battery 160) or may shut off power supplied to the battery 160.

The memory may include a volatile memory and/or a non-volatile memory. The memory may store instructions or data associated with at least one other element of the electronic device 100. According to an example embodiment, the memory may store software and/or a program. The program may include an application. The application may be a set of programs (or instructions) for performing at least one specified function and may include, for example, an application for managing power of the battery 160. The memory may include an internal memory or an external memory.

The function module may perform at least one of functions provided by the electronic device 100. For example, the function module may include a camera for performing a photographing function, a speaker (or receiver) for outputting sound, or the like.

The battery 160 may supply power to elements included in the electronic device 100. For example, the battery 160 may be electrically connected with the printed circuit board 150 to supply power to the electronic components mounted on the printed circuit board 150. The battery 160 may be disposed between the bracket 140 and the rear cover 180. For example, the battery 160 may be mounted on a rear surface of the bracket 140. According to various embodiments, the battery 160 may be integrated with the electronic device 100, or may be provided so as to be detachable from the electronic device 100.

The antenna unit 170 may include various antenna configurations and be disposed between the battery 160 and the rear cover 180 to overlap a rear surface of the battery 160. The antenna unit 170 may include a temperature sensor (e.g., a temperature detection line) for detecting the temperature of the battery 160. A physical property (e.g., resistance) of the temperature sensor may vary depending on a temperature change of the battery 160, and the processor connected with the temperature sensor may measure the temperature of the battery 160 on the basis of the variation in the physical property.

According to an embodiment, the temperature sensor may be formed in a wire form and may be disposed on the antenna unit 170 to be adjacent to at least one surface of the battery 160 or to overlap the surface of the battery 160. For example, the temperature sensor may be disposed on the antenna unit 170 to be adjacent to a peripheral area of the battery 160 or to overlap the peripheral area of the battery 160.

According to an embodiment, an antenna (e.g., a magnetic induction detecting antenna) (e.g., a coil unit) included in the communication module may be disposed on the antenna unit 170. For example, at least one coil antenna (e.g., coil unit) may be disposed on a central area of the antenna unit 170, and the temperature sensor may be disposed on a peripheral area of the antenna unit 170 to surround the antenna. The communication module may include various communication circuitry and establish communication between the electronic device 100 and an external device. For example, the communication module may be connected to a network through wireless or wired communication to communicate with the external device. The communication module may include an antenna for exchanging signals with the external device. For example, the communication module may include various communication circuitry, such as, for example, and without limitation, at least one antenna for wireless charging (e.g., wpc), NFC, MST, or the like.

The rear cover 180 may form the rear (and lateral) exterior of the electronic device 100. For example, the rear cover 180 may be fastened to the bracket 140 and/or the front cover 110 to cover the printed circuit board 150 and the battery 160 mounted on the rear surface of the bracket 140. According to various embodiments, the rear cover 180 may be integrated with the electronic device 100, or may be provided so as to be detachable from the electronic device 100.

Figure 2:
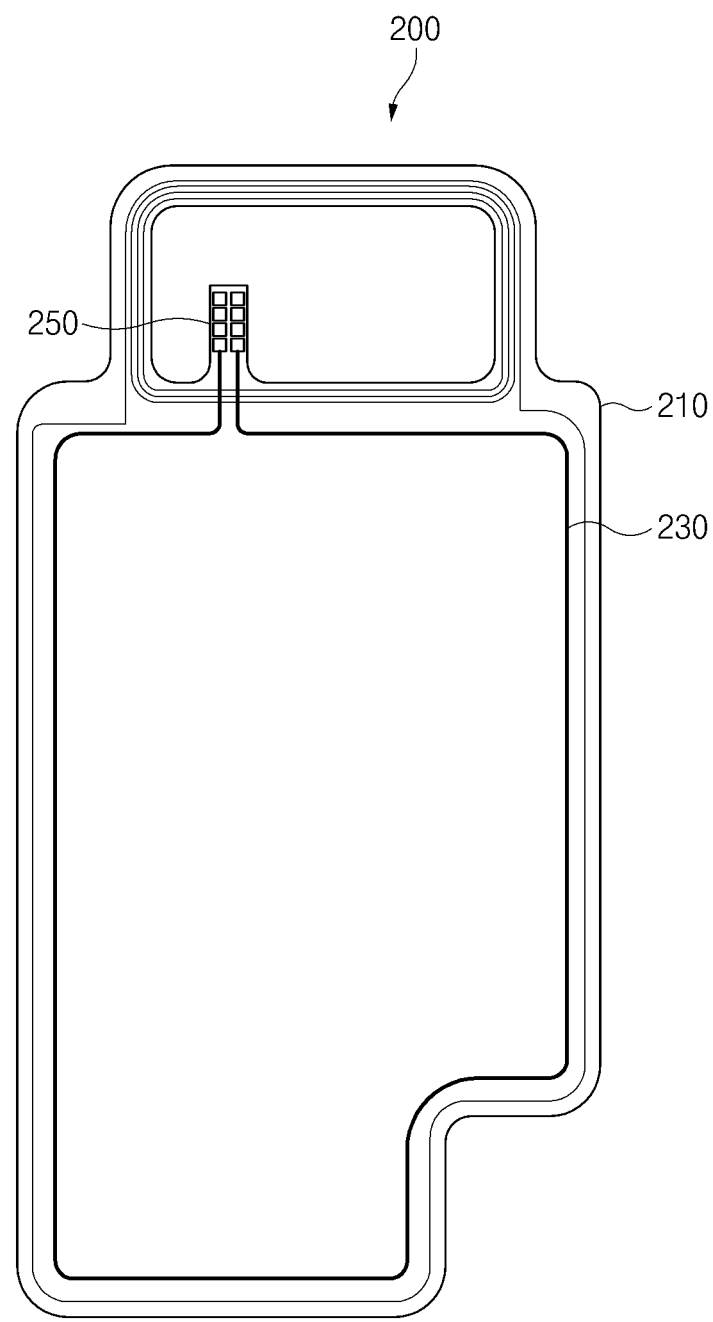
FIG. 2 is a diagram illustrating an example temperature detection device according to an example embodiment of the present disclosure.

FIG. 2 is a diagram illustrating an example temperature detection device according to an example embodiment of the present disclosure.

Referring to FIG. 2, a temperature detection device 200 (e.g., the antenna unit 170) may include a substrate 210 having a substantially rectangular shape.

According to an embodiment of the present disclosure, the temperature detection device 200 may include, on the substrate 210, a temperature detection line 230 (e.g., a temperature sensor) for detecting temperature and a contact part 250 (or e.g., a contact terminal) for contact with a printed circuit board (e.g., the printed circuit board 150) of an electronic device (e.g., the electronic device 100). The temperature detection device 200 may include an antenna (e.g., a coil unit) disposed on a specified area of the substrate 210 to transmit or receive a signal.

According to an embodiment of the present disclosure, the antenna may include, for example, and without limitation, at least one coil serving as a magnetic induction detection antenna.

According to an embodiment of the present disclosure, a shape-memory alloy part may be disposed on the substrate 210. For example, the shape-memory alloy part may be disposed adjacent to the temperature detection line 230. The substrate 210 may have a shape corresponding to the shape of a battery (e.g., the battery 160). In another example, the substrate 210 may have horizontal and vertical lengths longer than the horizontal and vertical lengths of the battery to cover the entire area of the battery. According to an embodiment, the substrate 210 may be formed of a flexible material. For example, the substrate 210 may include a flexible printed circuit board (FPCB).

The temperature detection line 230 may provide an electrical pathway with the contact part 250 as a starting point and an ending point. According to an embodiment, the temperature detection line 230 (e.g., a wire type/shape temperature sensor) may be disposed on a peripheral area of the substrate 210. For example, the temperature detection line 230 may be disposed along the periphery of the substrate 210 from one point (e.g., a first terminal) of the contact part 250 to another point (e.g., a second terminal) of the contact part 250. However, an arrangement of the temperature detection line 230 is not limited thereto. The temperature detection line 230 may be disposed, on the substrate 210, in various loop shapes formed of at least one wire that starts from one point of the contact part 250 and ends at another point of the contact part 250.

Figure 3A:
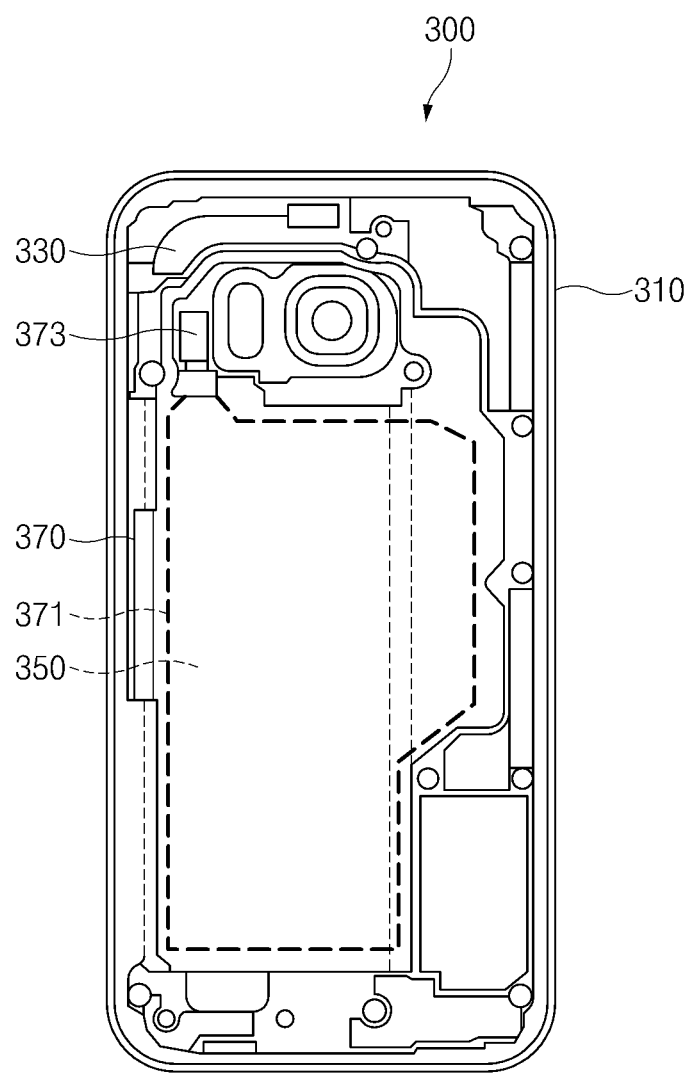
FIGS. 3A and 3B are diagrams illustrating an example overlapping area between a temperature detection line and a battery, according to an example embodiment of the present disclosure.
Figure 3B:
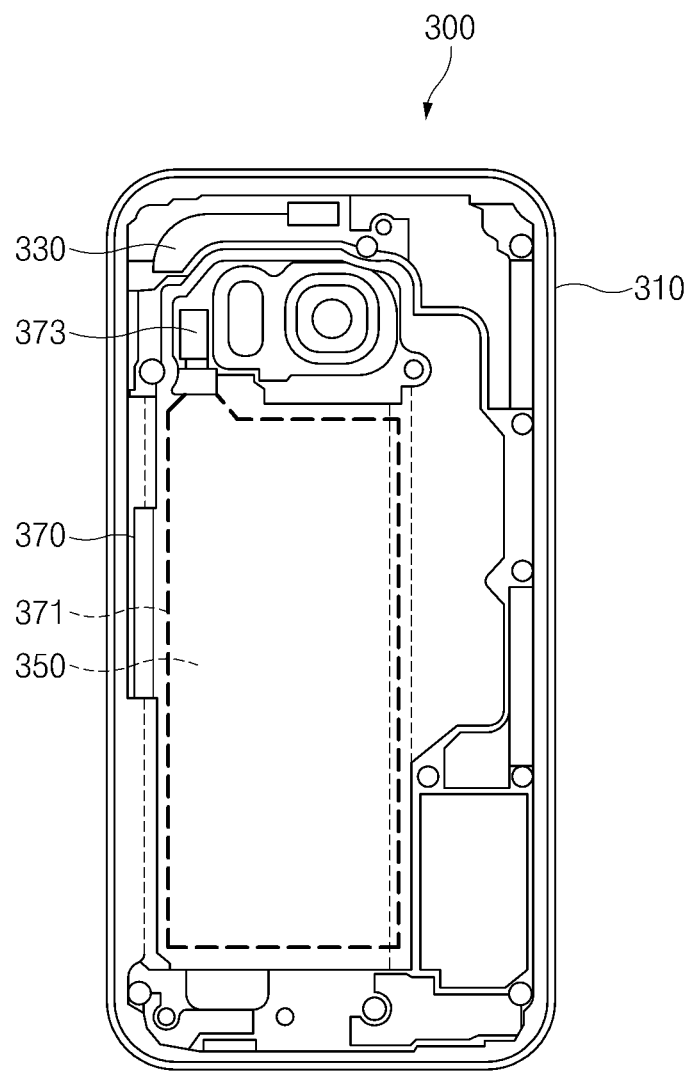

FIGS. 3A and 3B are diagrams illustrating an example overlapping area between a temperature detection line and a battery, according to an example embodiment of the present disclosure.

Referring to FIGS. 3A and 3B, an electronic device 300 (e.g., the electronic device 100) may include a housing 310, a printed circuit board 330 disposed inside the housing 310, a battery 350 disposed inside the housing 310, and a substrate 370 having a temperature detection line 371 (e.g., a temperature sensor) disposed thereon for detecting the temperature of the battery 350. The housing 310 may include a front surface, a rear surface, and a side surface surrounding at least part of a space between the front surface and the rear surface. The printed circuit board 330 may be fixedly mounted in the housing 310. According to an embodiment, the housing 310 may have side walls on a side of the interior thereof to provide a space in which the battery 350 is mounted.

The printed circuit board 330 may have various types of electronic components mounted thereon. For example, a processor may be mounted on the printed circuit board 330. The processor may be electrically connected with the temperature detection line 371 through a contact part 373. According to an embodiment of the present disclosure, the contact part 373 may include a first terminal and a second terminal, and the first terminal and the second terminal may be electrically connected with opposite ends of the temperature detection line 371. Through the first terminal and the second terminal, the processor may check a characteristic value varying along the temperature detection line 371. For example, the processor may obtain a characteristic value (e.g., resistance) of the temperature detection line 371 and may measure the temperature of the battery 350 on the basis of the characteristic value.

As illustrated in FIGS. 3A and 3B, the substrate 370 having the temperature detection line 371 disposed thereon may be mounted on a surface (e.g., the rear surface) of the battery 350 and may overlap the surface of the battery 350. According to an embodiment, the substrate 370 may have horizontal and vertical lengths longer than the horizontal and vertical lengths of the battery 350 such that the overlapping area between the substrate 370 and the battery 350 occupies the greater part of the surface of the battery 350. According to an embodiment, the shape of the substrate 370 may correspond to the shape of the battery 350.

The temperature detection line 371 may be formed in a wire form and may be disposed on the substrate 370 to be adjacent to at least one surface of the battery 350 or overlap the surface of the battery 350. For example, the temperature detection line 371 may be disposed on a peripheral area of the substrate 370 to be adjacent to a peripheral area of the battery 350 or overlap the peripheral area of the battery 350.

As illustrated in FIG. 3A, the temperature detection line 371 may be disposed along the periphery of the substrate 370 from one point of the contact part 373 to another point of the contact part 373, or as illustrated in FIG. 3B, the temperature detection line 371 may extend along the periphery of a section of the substrate 370 and then traverse the middle area of the substrate 370. As illustrated in FIG. 3B, the temperature detection line 371 may be disposed on the substrate 370 such that at least a part of the temperature detection line 371 overlaps the periphery of the battery 350 or is located on an upper side of the periphery of the battery 350, or as illustrated in FIG. 3A, the temperature detection line 371 may be disposed on the substrate 370 such that one part of the temperature detection line 371 overlaps at least one area (e.g., the periphery) of the battery 350 and the other part is adjacent to the periphery of the battery 350 without overlap. Since the temperature detection line 371 is disposed along the periphery of the substrate 370 in FIG. 3A, a large area for installation of another element (e.g., an antenna) may be ensured in the middle of the substrate 370.

Although FIGS. 3A and 3B illustrate that the temperature detection line 371 is implemented with a single wire, the temperature detection line 371 is not limited thereto. In an example embodiment, a plurality of temperature detection lines 371 may be disposed on the substrate 370. Furthermore, although FIGS. 3A and 3B illustrate that the temperature detection line 371 is disposed in a substantially rectangular loop shape on the substrate 370, the temperature detection line 371 is not limited thereto. In an embodiment, the temperature detection line 371 may be disposed on the substrate 370 in a shape in which the temperature detection line 371 is corrugated in the horizontal or vertical direction of the substrate 370.

Figure 4:
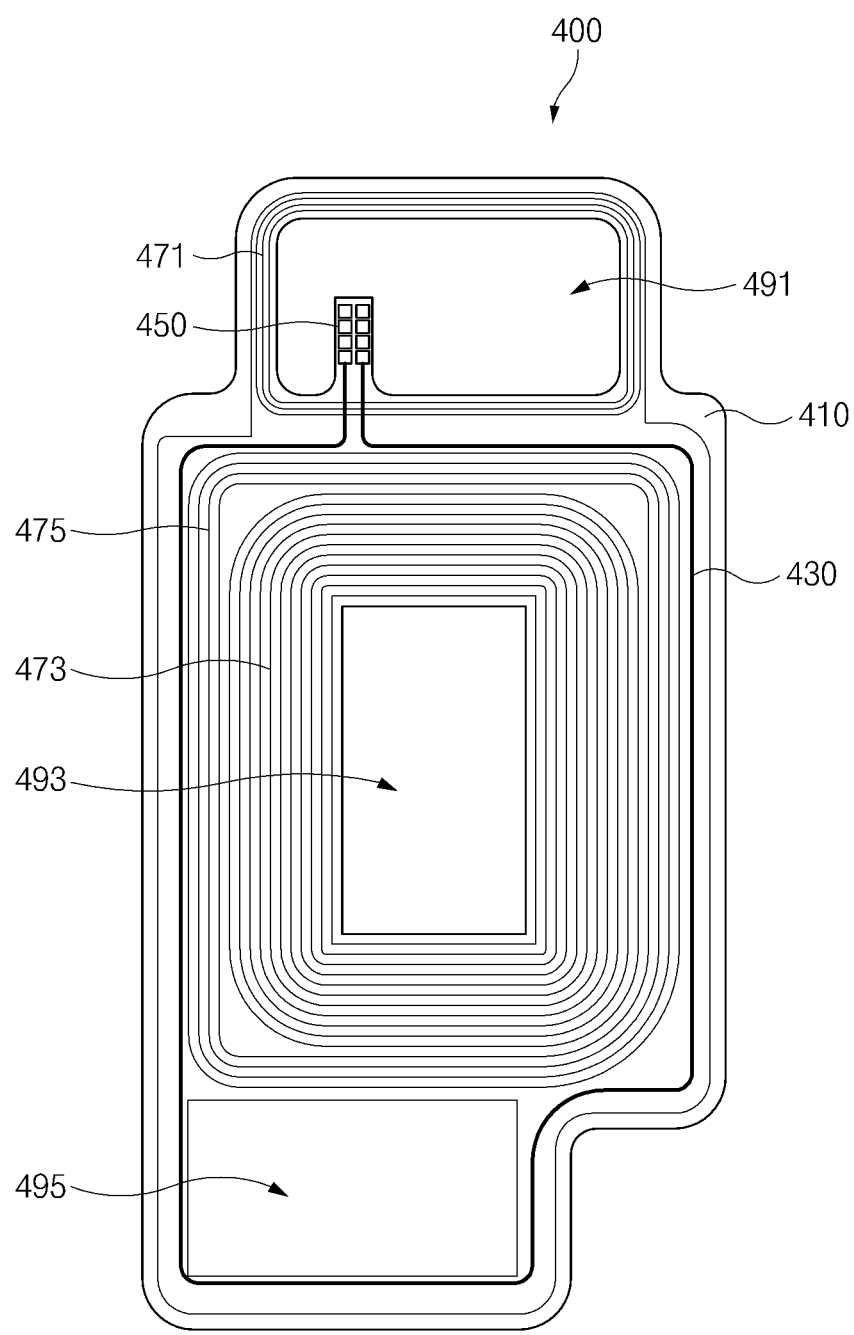
FIG. 4 is a diagram illustrating an example state in which at least one coil is disposed on a substrate having a temperature detection line disposed thereon, according to an example embodiment of the present disclosure.

FIG. 4 is a diagram illustrating an example state in which at least one coil is disposed on a substrate having a temperature detection line disposed thereon, according to an example embodiment of the present disclosure.

Referring to FIG. 4, an antenna unit 400 (e.g., the antenna unit 170 or the temperature detection device 200) may include a substrate 410 having a substantially rectangular shape, a temperature detection line 430 (e.g., a temperature sensor) disposed on the substrate 410, and a contact part 450 for contact with a printed circuit board (e.g., the printed circuit board 150) of an electronic device (e.g., the electronic device 100).

According to an embodiment, at least one antenna for communication may be disposed on the substrate 410. For example, the temperature detection line 430 may be disposed on a peripheral area of the substrate 410, and a coil antenna (e.g., a coil unit) may be disposed on a central area of the substrate 410. In FIG. 4, the antenna unit 400 may include a first antenna 471 (e.g., a first coil unit) disposed in a coil form on an upper end portion 491 of the substrate 410, a second antenna 473 (e.g., a second coil unit) disposed in a coil form on a central portion 493 of the substrate 410, and a third antenna 475 (e.g., a third coil unit) disposed in a coil form outward of the second antenna 473 to surround the second antenna 473. However, the number and position of antennas disposed on the substrate 410 are not limited thereto.

According to an embodiment, the substrate 410 may include at least one opening. For example, the substrate 410 may have an opening formed in the upper end portion 491 thereof and an opening formed in a lower end portion 495 thereof. In another example, a separate correction material may be disposed at the openings formed in the substrate 410. The substrate 410 may have a poron tape attached to the lower end portion 495 thereof. In an embodiment, the lower end portion 495 of the substrate 410 may not have an opening, and a poron tape may be attached to the lower end portion 495 of the substrate 410.

According to an embodiment, the first antenna 471 may, for example, and without limitation, support magnetic stripe transmission (MST) communication. The MST may generate a pulse in response to transmission data by using an electromagnetic signal, and the pulse may generate a magnetic field signal.

According to an embodiment, the second antenna 473 may, for example, and without limitation, support wireless charging. For example, the second antenna 473 may collect wireless power supplied from a transmission coil disposed in an external wireless charging device and may charge a battery (e.g., the battery 160) by using the collected wireless power.

According to an embodiment, the third antenna 475 may, for example, and without limitation, support near field communication (NFC). For example, the third antenna 475 may support short-range wireless communication capable of communicating data in both directions in a specified frequency band. However, applications of the antennas are not limited thereto. At least one of the antennas may be used for a different purpose and may be replaced with a different element.

Figure 5:
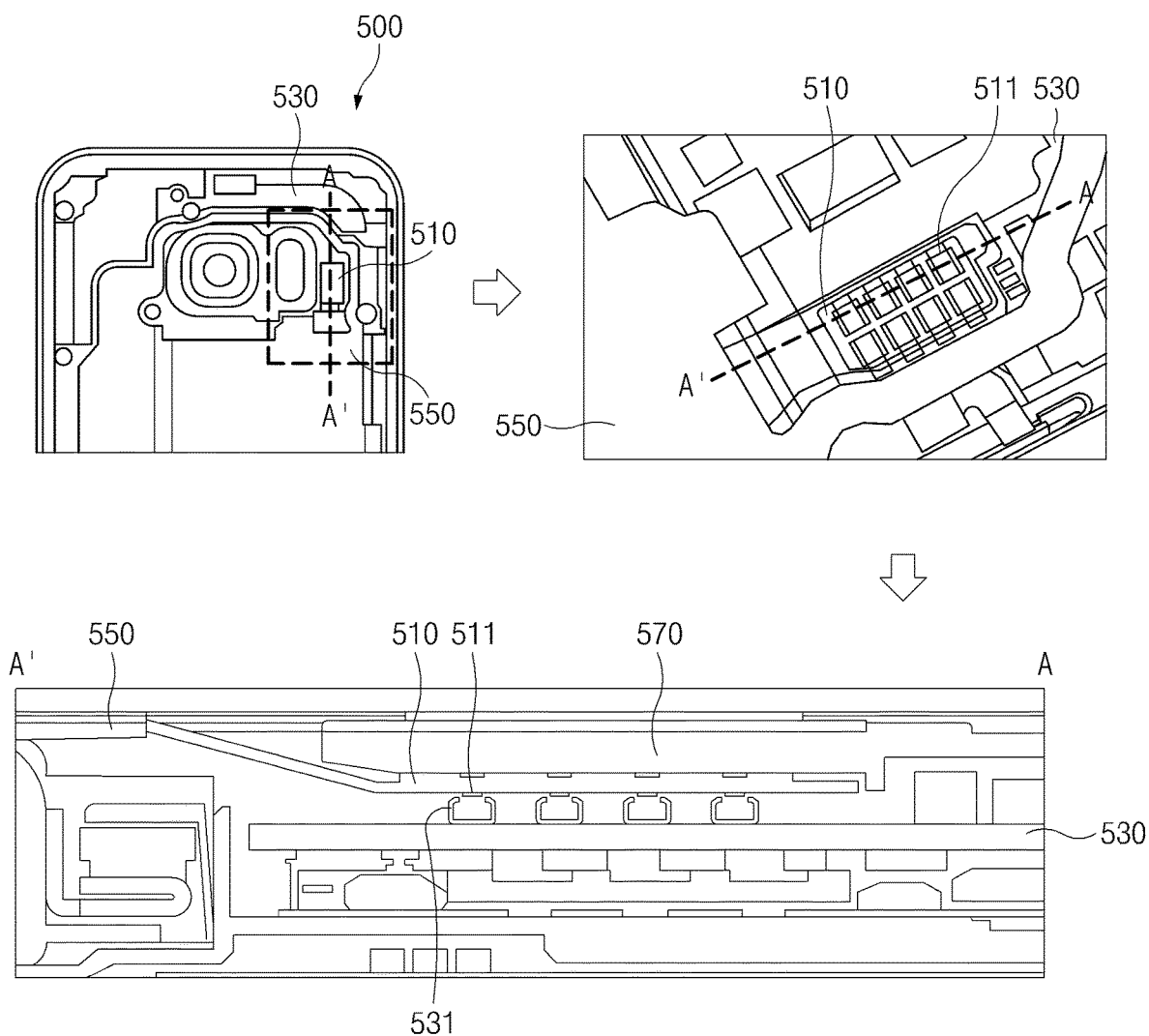
FIG. 5 is a diagram illustrating an example connection between a substrate having a temperature detection line disposed thereon and a printed circuit board, according to an example embodiment of the present disclosure.

FIG. 5 is a diagram illustrating an example connection between a substrate having a temperature detection line disposed thereon and a printed circuit board, according to an example embodiment of the present disclosure.

Referring to FIG. 5, a printed circuit board 530 (e.g., the printed circuit board 150) disposed inside an electronic device 500 (e.g., the electronic device 100) and an antenna unit 550 (e.g., the antenna unit 170 or the temperature detection device 200) may be electrically connected with each other through a contact part 510. The contact part 510 may include at least one contact 511. For example, the contact part 510 may include a first contact for a temperature detection line and may further include at least one of a second contact for an MST antenna, a third contact for an NFC antenna, and a fourth contact for a wireless charging coil.

According to an embodiment, the contact 511 may be brought into contact with a C-clip 531 disposed on the printed circuit board 530. In this case, a temperature detection line, an MST antenna, an NFC antenna, and a wireless charging coil disposed on the antenna unit 550 may be electrically connected with the printed circuit board 530 through the contact 511 and the C-clip 531.

According to an embodiment, when the contact 511 is brought into contact with the corresponding C-clip 531, if a rear cover 570 is fastened to cover a rear surface of the printed circuit board 530, the rear cover 570 may press the contact part 510, and thus the contact between the contact 511 of the contact part 510 and the C-clip 531 of the printed circuit board 530 may be stably maintained.

Figure 6:
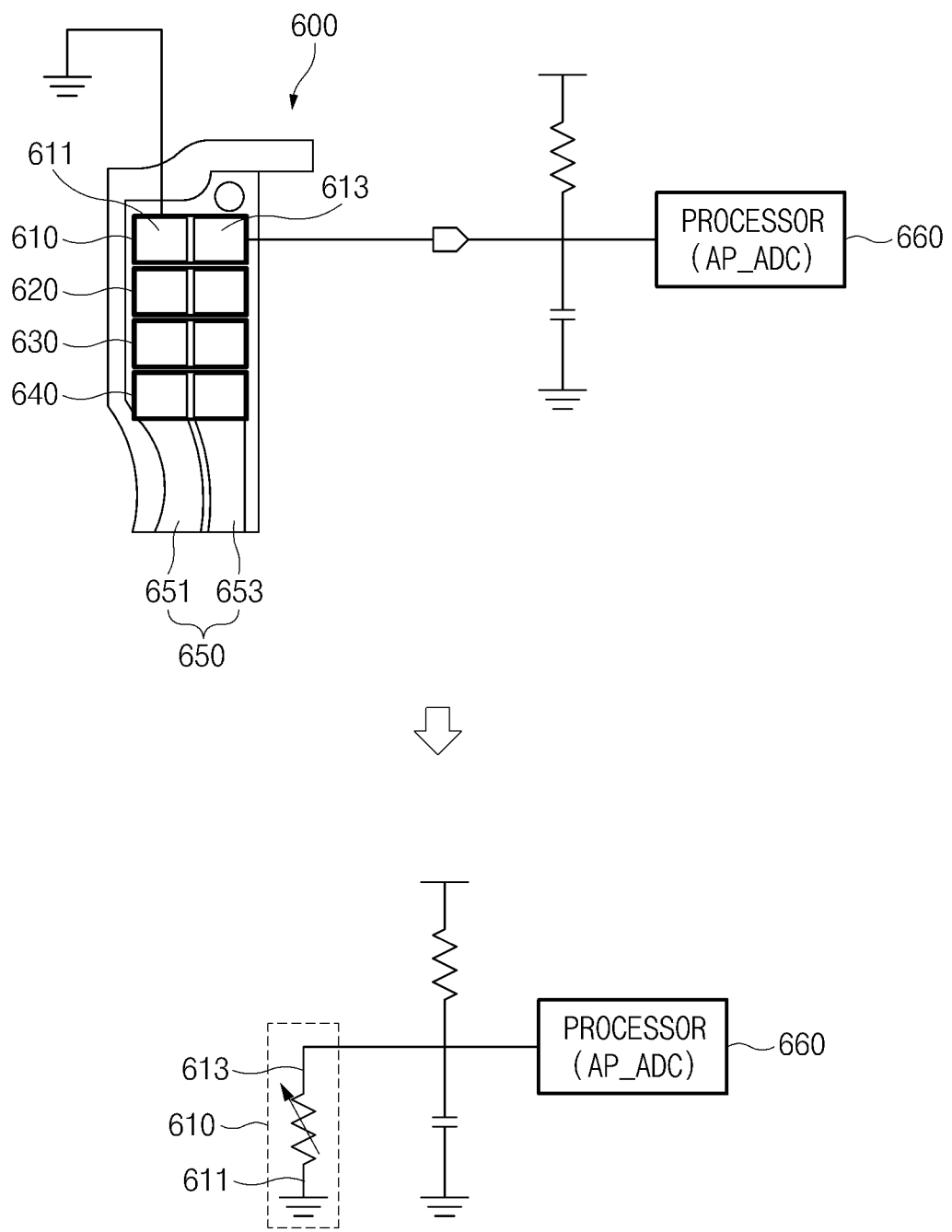
FIG. 6 is a diagram illustrating an example configuration of a circuit for detecting the temperature of a battery, according to an example embodiment of the present disclosure.

FIG. 6 is a diagram illustrating an example configuration of a circuit for detecting the temperature of a battery, according to an example embodiment of the present disclosure.

Referring to FIG. 6, a circuit 600 for detecting the temperature of a battery (e.g., the battery 160) may include a temperature detection line 650 and a processor (e.g., including processing circuitry) 660 electrically connected with the temperature detection line 650.

According to an embodiment, the temperature detection line 650 formed in a wire form to connect a sensor for detecting temperature and a detection circuit may have one end portion 651 connected with a first terminal 611 of a first contact 610 and another end portion 653 connected with a second terminal 613 of the first contact 610. For example, the temperature detection line 650 may start from the first terminal 611 of the first contact 610, may form a loop adjacent to or overlapping one surface of the battery, and may connect to the second terminal 613 of the first contact 610.

According to an embodiment, the first terminal 611 and the second terminal 613 of the first contact 610 may be connected with the processor 660 through different routes, and thus the temperature detection line 650 and the processor 660 connected to the first terminal 611 and the second terminal 613 of the first contact 610 may comprise the circuit 600 for detecting the temperature of the battery.

An upper portion of FIG. 6 illustrates a state in which the temperature detection line 650 and the processor 660 are connected to a contact part (e.g., the first contact 610), and a lower portion of FIG. 6 illustrates an equivalent circuit to the temperature detection circuit 600 including the temperature detection line 650 and the processor 660. Referring to the lower portion of FIG. 6, the temperature detection line 650 connected with the first contact 610 may function similarly to the variable resistance 610 on the temperature detection circuit 600 since a characteristic value (e.g., resistance) of the temperature detection line 650 varies depending on a temperature change of the battery. Accordingly, the processor 660 may calculate (determine) the variable resistance 610 and may determine the temperature of the battery on the basis of the calculated result.

According to various embodiments, the contact part may further include at least one other contact, in addition to the first contact 610. As illustrated in FIG. 6, the contact part may further include a second contact 620 connected, for example, with an MST antenna, a third contact 630 connected, for example, with an NFC antenna, and a fourth contact 640 connected, for example, with a wireless charging coil. Likewise to the first contact 610, the second contact 620, the third contact 630, and the fourth contact 640 may, for example, also be electrically connected with the processor 660.

Figure 7:
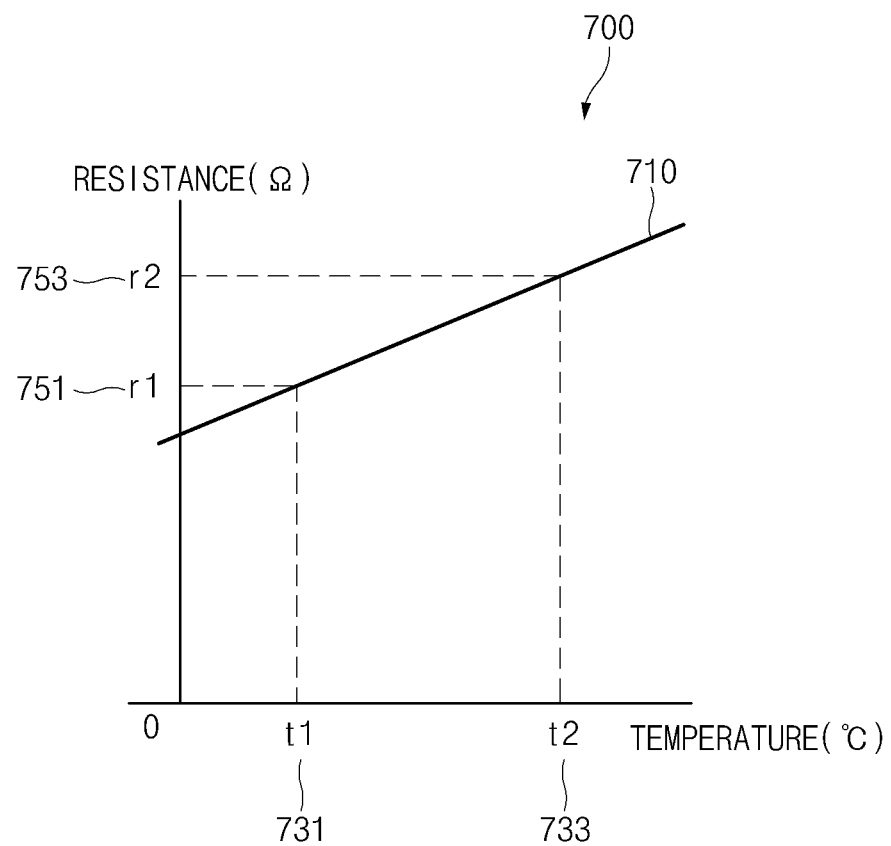
FIG. 7 is a graph illustrating an example characteristic of a temperature detection line according to an example embodiment of the present disclosure.

FIG. 7 is a graph illustrating an example characteristic of a temperature detection line according to an example embodiment of the present disclosure.

Referring to FIG. 7, in a characteristic graph 700 of a temperature detection line, a characteristic value (e.g., resistance) of the temperature detection line may vary depending on a temperature change. For example, the characteristic value of the temperature detection line may linearly vary depending on a temperature change. A change 710 in the characteristic value of the temperature detection line depending on a temperature change shows that the temperature detection line has a first characteristic value (r1) 751 at a first temperature (t1) 731 and a second characteristic value (r2) 753, which is higher than the first characteristic value (r1) 751, at a second temperature (t2) 733 higher than the first temperature (t1) 731. However, a change in the characteristic value of the temperature detection line is not limited thereto. According to various embodiments, the change 710 in the characteristic value of the temperature detection line depending on a temperature change may be formed in a straight-line shape with a negative slope or in a curvilinear shape, as well as in the straight-line shape 710 with a positive slope.

Figure 8A:
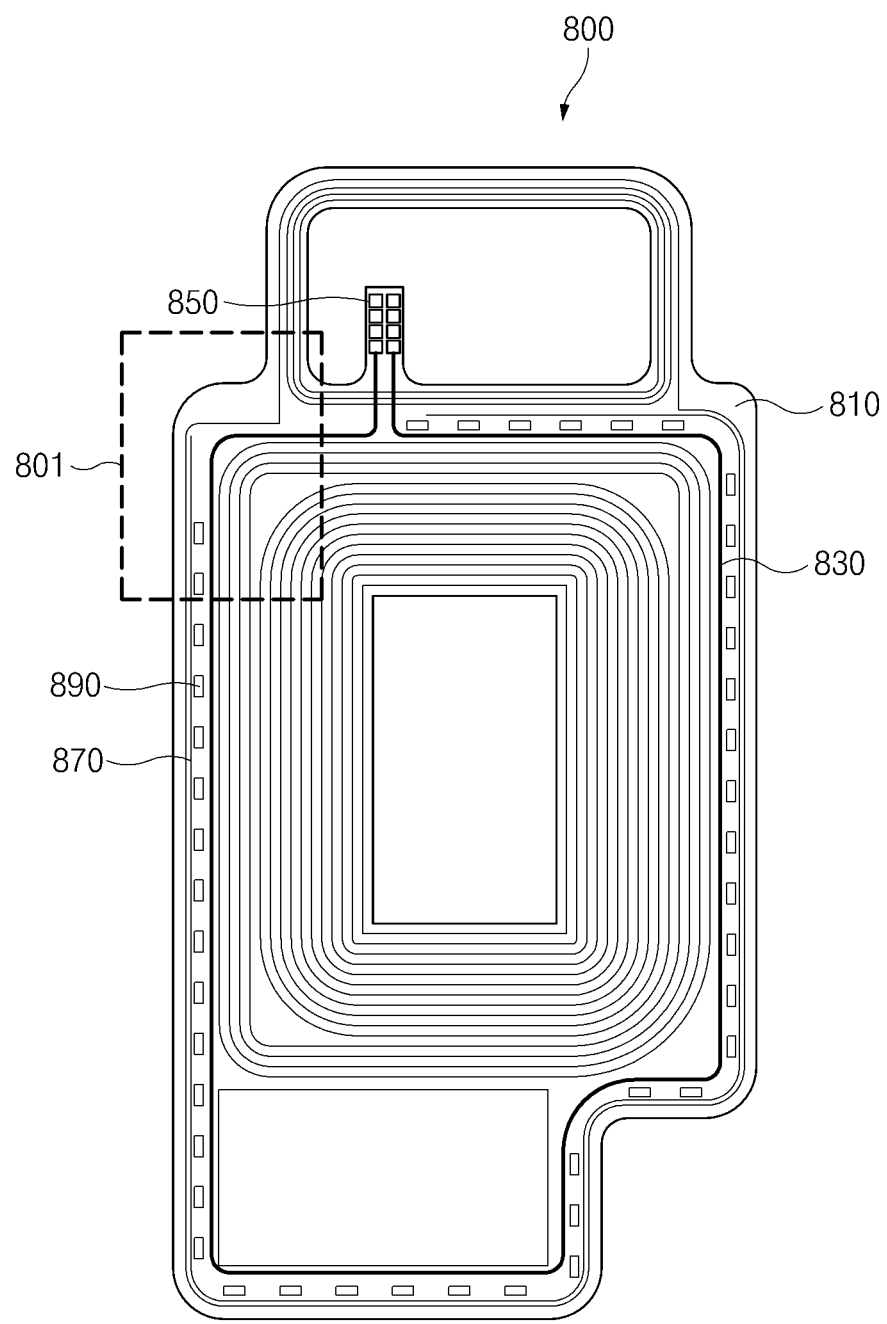
FIG. 8A is a diagram illustrating an example state in which a material, the shape of which varies depending on a temperature change, is disposed on a substrate having a temperature detection line disposed thereon, according to an example embodiment of the present disclosure.
Figure 8B:
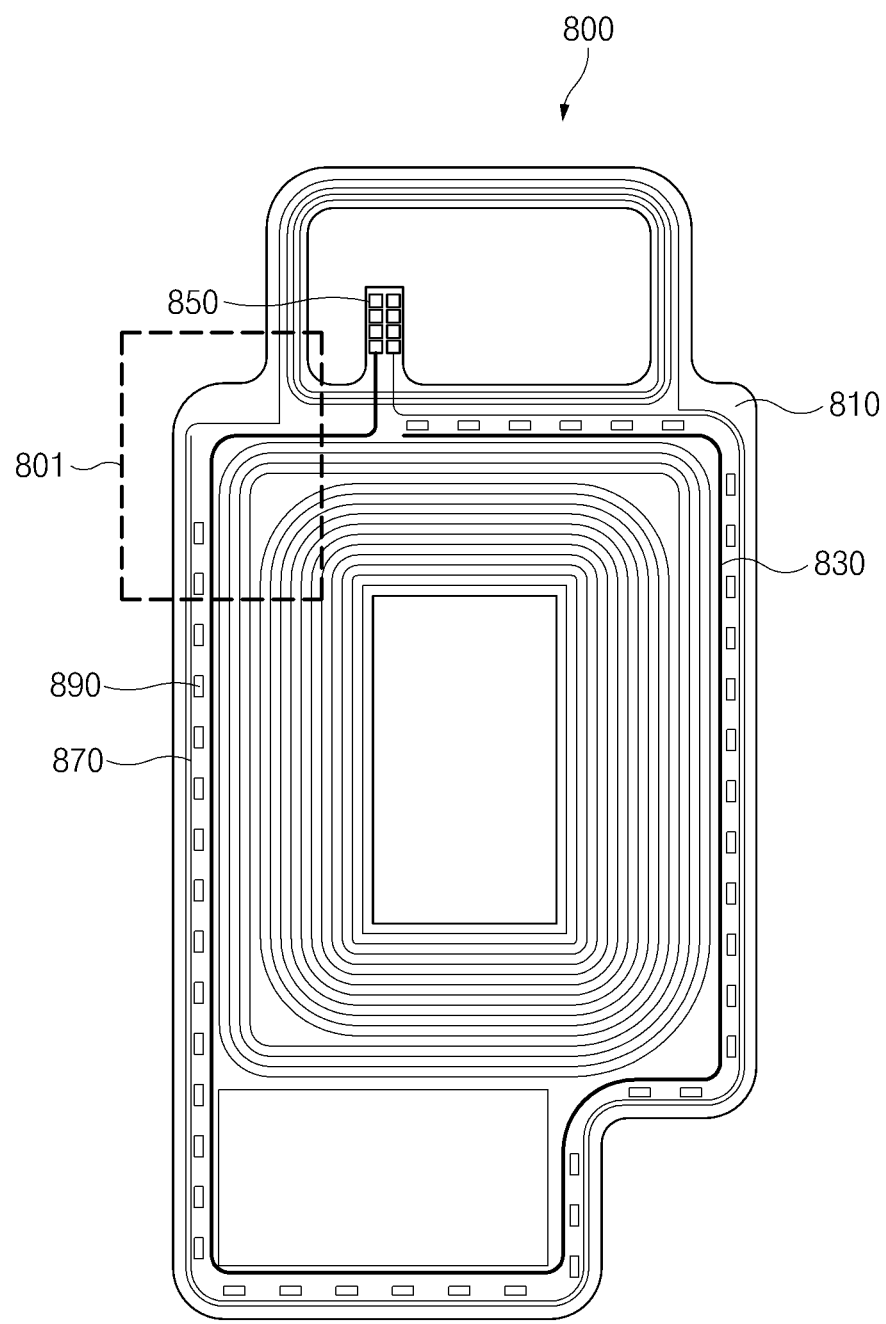
FIG. 8B is a diagram illustrating an example state in which a material, the shape of which varies depending on a temperature change, is differently disposed on a substrate having a temperature detection line disposed thereon, according to an example embodiment of the present disclosure.

FIG. 8A is a diagram illustrating an example state in which a material, the shape of which varies depending on a temperature change, is disposed on a substrate having a temperature detection line disposed thereon, according to an example embodiment of the present disclosure. FIG. 8B is a diagram illustrating an example state in which a material, the shape of which varies depending on a temperature change, is differently disposed on a substrate having a temperature detection line disposed thereon, according to an example embodiment of the present disclosure.

Referring to FIGS. 8A and 8B, an antenna unit 800 (e.g., the antenna unit 170 or the temperature detection device 200) may include a substrate 810 having a substantially rectangular shape, a temperature detection line 830 (e.g., a temperature sensor) disposed on the substrate 810, and a contact part 850 for contact with a printed circuit board (e.g., the printed circuit board 150) of an electronic device (e.g., the electronic device 100). Furthermore, at least one antenna for communication may be disposed on the substrate 810. For example, the temperature detection line 830 may be disposed on a peripheral area of the substrate 810, and a coil antenna (e.g., a coil unit) may be disposed on a central area and/or an upper end area of the substrate 810.

According to an embodiment, a shape-changing material 870, the shape of which physically varies depending on a temperature change of a battery (e.g., the battery 160), may be disposed on the substrate 810. The shape-changing material 870 may include, for example, a shape-memory alloy. The shape-memory alloy may be manufactured by making the alloy in a first shape and then deforming the alloy into a second shape under a different temperature condition. The shape-memory alloy manufactured in this way may return to the first shape, which is the original shape, if a temperature condition is set to the previous temperature condition. That is, the shape-memory alloy may return to the original shape depending on a temperature change. Furthermore, since the shape-memory alloy has high fatigue resistance, the shape-memory alloy may have no limitation on the number of times that the shape-memory alloy is deformed. According to an embodiment, the shape-changing material 870 may be disposed on the peripheral area of the substrate 810 along the temperature detection line 830.

According to an embodiment, a stopper 890 may be additionally disposed on the substrate 810 to prevent the shape-changing material 870 from making contact with the temperature detection line 830 in an area other than a specified area. For example, the stopper 890 may be disposed between the shape-changing material 870 and the temperature detection line 830. As illustrated in FIGS. 8A and 8B, a plurality of stoppers 890 may be disposed between the shape-changing material 870 and the temperature detection line 830. However, the shape and arrangement of the stoppers 890 are not limited thereto. In an embodiment, a single stopper 890 having a long line shape may be disposed between the shape-changing material 870 and the temperature detection line 830.

According to an embodiment, the shape-changing material 870 may not be connected to the contact part 850 as illustrated in FIG. 8A, or may be connected, at one end thereof, to the contact part 850 as illustrated in FIG. 8B. In FIG. 8A, a characteristic value (e.g., resistance) may be determined by only the temperature detection line 830 in the state in which the shape-changing material 870 does not make contact with the temperature detection line 830, and may be determined by the shape-changing material 870 and the temperature detection line 830 if the shape-changing material 870 makes contact with the temperature detection line 830 depending on a temperature change. That is, as in the equivalent circuit illustrated in FIG. 6, the shape-changing material 870 and the temperature detection line 830 may function as the variable resistance 610, the characteristic value of which varies depending on a temperature change. In FIG. 8B, the shape-changing material 870 may be connected to one point (e.g., a first terminal) of the contact part 850, and the temperature detection line 830 may be connected to another point (e.g., a second terminal) of the contact part 850. Accordingly, the circuit may be open in the state in which the shape-changing material 870 does not make contact with the temperature detection line 830, and may short-circuit if the shape-changing material 8780 makes contact with the temperature detection line 830 depending on a temperature change. That is, as in the equivalent circuit illustrated in FIG. 12, the shape-changing material 870 and the temperature detection line 830 may function as a switch circuit 1210, the open/closed state of which is determined depending on a temperature change.

Figure 9:
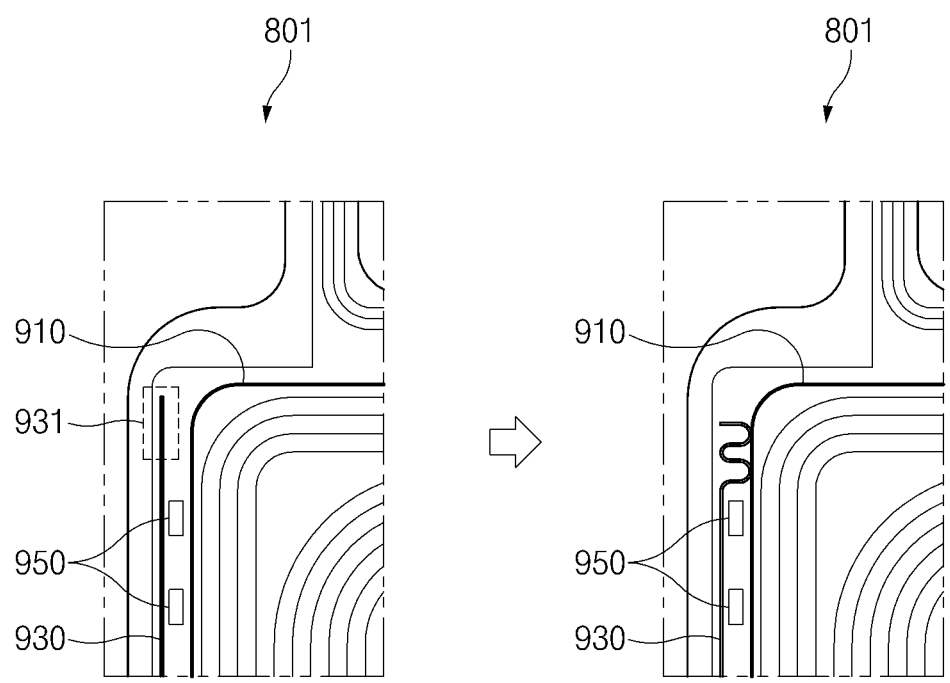
FIG. 9 is a illustrating an example change in the state of a material, the shape of which varies depending on a temperature change, according to an example embodiment of the present disclosure.

FIG. 9 is a diagram illustrating an example change in the state of a material, the shape of which varies depending on a temperature change, according to an example embodiment of the present disclosure. FIG. 9 is a blowup of a partial area 801 illustrated in FIG. 8A or 8B.

Referring to FIG. 9, a shape-changing material 930 (e.g., a shape-memory alloy) may be disposed adjacent to a temperature detection line 910 (e.g., a temperature sensor). Furthermore, at least one stopper 950 may be disposed between the shape-changing material 930 and the temperature detection line 910.

At least a part (e.g., a distal end 931) of the shape-changing material 930 may change in shape depending on a temperature change. For example, as illustrated in the left portion of FIG. 9, the distal end 931 of the shape-changing material 930 may have a straight-line shape substantially parallel to the temperature detection line 910 at a temperature lower than a specified temperature, and as illustrated in the right portion of FIG. 9, the distal end 931 of the shape-changing material 930 may be deformed, for example, into a corrugated shape to make contact with the temperature detection line 910 at the specified temperature or higher.

According to an embodiment, at least one stopper 950 may be additionally disposed to prevent the shape-changing material 930 from making contact with the temperature detection line 910 in an area other than a specified area (e.g., the distal end 931). For example, the stopper 950 may be disposed between another portion of the shape-changing material 930, other than the distal end 931, and the temperature detection line 910.

According to an embodiment, a deformed portion of the shape-changing material 930 is not limited to the distal end. The shape-changing material 930 may be deformed at any intermediate position on the loop and may be deformed at a plurality of positions rather than one position.

Figure 10:
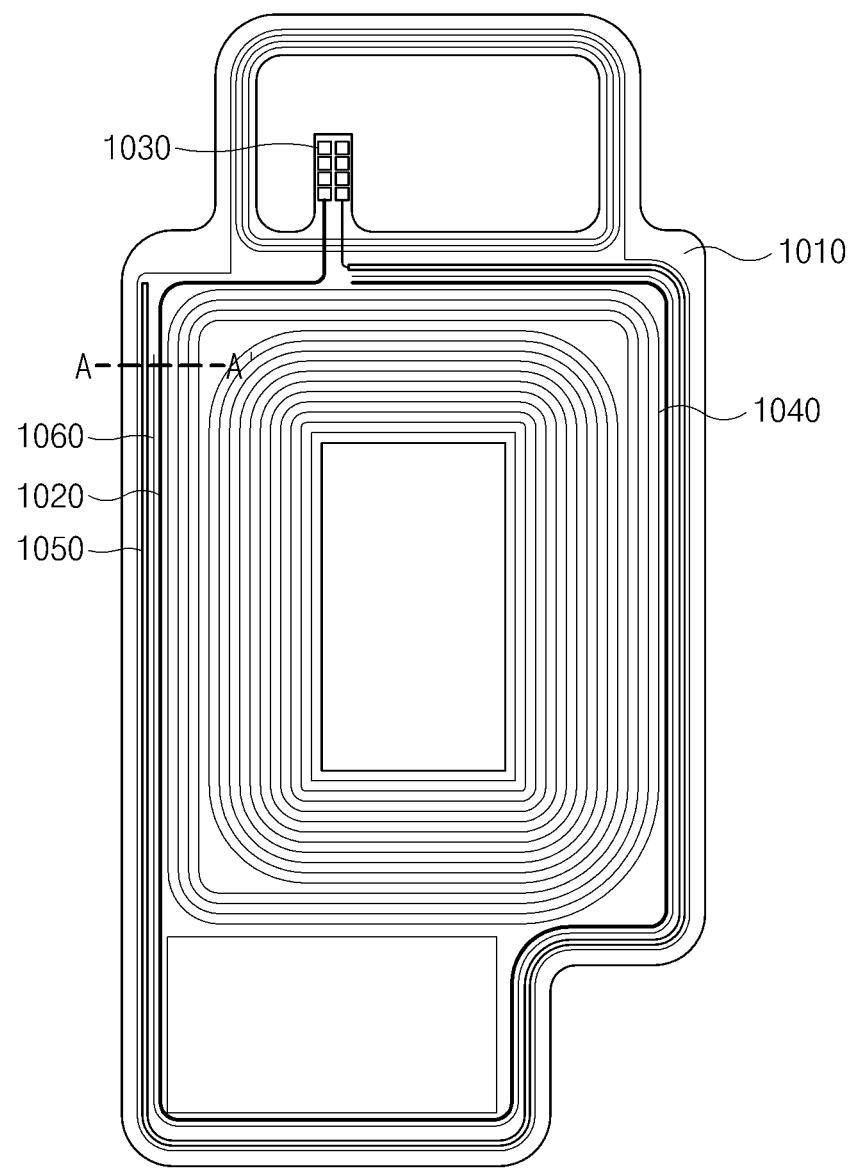
FIG. 10 is a diagram illustrating an example stopper disposed to prevent a material, the shape of which varies depending on a temperature change, from making contact with a temperature detection line in an area other than a specified area, according to an example embodiment of the present disclosure.
Figure 11:
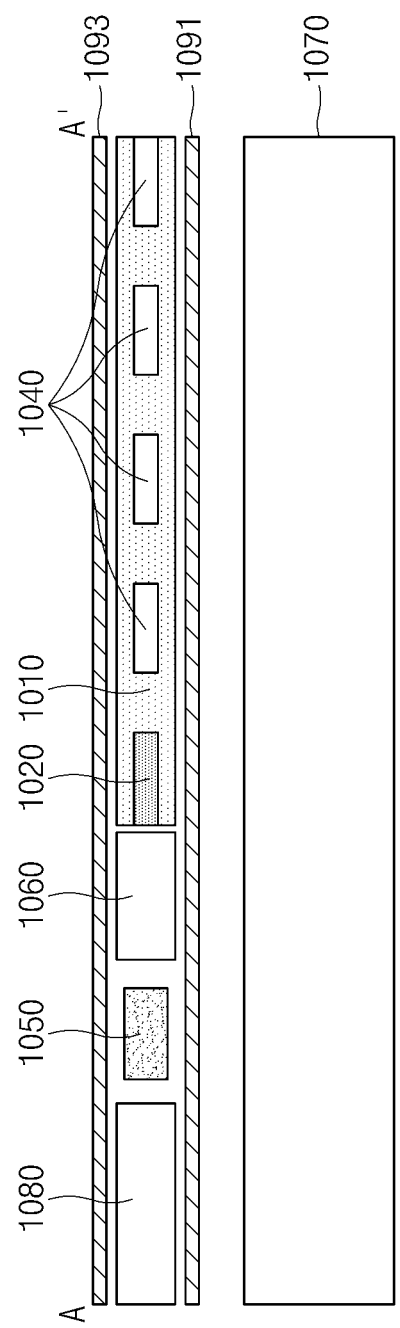
FIG. 11 is a sectional view taken along line A-A' of FIG. 10, according to an example embodiment of the present disclosure.

FIG. 10 is a diagram illustrating an example stopper disposed to prevent a material, the shape of which varies depending on a temperature change, from making contact with a temperature detection line in an area other than a specified area, according to an example embodiment of the present disclosure. FIG. 11 is a sectional view taken along line A-A' of FIG. 10, according to an example embodiment of the present disclosure.

Referring to FIGS. 10 and 11, a temperature sensor 1020 (e.g., a temperature detection line) may be disposed to be adjacent to or overlap one surface of a battery 1070. The temperature sensor 1020 may be disposed on a substrate 1010 having a rectangular shape.

The substrate 1010 may include a contact part 1030 for contact with a printed circuit board (e.g., the printed circuit board 150) of an electronic device (e.g., the electronic device 100), at least one antenna 1040 (e.g., coil unit) for communication, a shape-changing material 1050 disposed adjacent to the temperature sensor 1020, and a stopper 1060 disposed between the temperature sensor 1020 and the shape-changing material 1050.

According to an embodiment, a plurality of stoppers 1060 may be arranged at a predetermined interval, as in FIGS. 8A, 8B, and 9, and the single stopper 1060 having a long line shape may be disposed between the shape-changing material 1050 and the temperature sensor 1020, as in FIG. 10. For example, the stopper 1060 may be disposed between the temperature sensor 1020 and an area of the shape-changing material 1050 other than a specified area (e.g., the distal end 931) along the shape-changing material 1050.

According to an embodiment, the stopper 1060 may be formed of the same material as the antenna 1040 and may be manufactured by the same process (e.g., etching) as the antenna 1040. The stopper 1060 may be formed of a conductive material, in which case the stopper 1060 may be manufactured in a structure for minimizing an interaction with the antenna 1040, for example, in a shape in which the plurality of stoppers 1060 are separated from one another.

According to an embodiment, the stopper 1060 may be formed of the same material as an adhesive layer 1080 and may be manufactured by the same process as the adhesive layer 1080. The adhesive layer 1080 may be a double-sided tape or an adhesive. According to an embodiment, in the case where the adhesive layer 1080 is implemented with a double-sided tape, only an area of the shape-changing material 1050 other than a shape-changing area (e.g., the distal end 931) may be secured by using the double-sided tape.

According to an embodiment, a protective layer 1093 may be disposed above the substrate 1010 to protect elements disposed on the substrate 1010 from an external environment, and a shield layer 1091 may be disposed below the substrate 1010.

Figure 12:
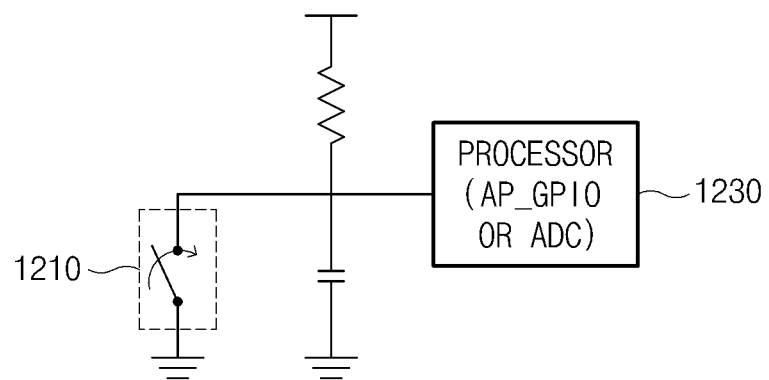
FIG. 12 is a diagram illustrating an example configuration of another circuit for detecting the temperature of a battery, according to an example embodiment of the present disclosure.

FIG. 12 is a diagram illustrating an example configuration of another circuit for detecting the temperature of a battery, according to an example embodiment of the present disclosure.

Referring to FIG. 12, a circuit for detecting the temperature of a battery (e.g., the battery 160) may include a temperature detection line (e.g., the temperature detection line 910), a shape-changing material (e.g., the shape-changing material 930) disposed adjacent to the temperature detection line, and a processor (e.g., including processing circuitry) 1230 electrically connected with the temperature detection line. Alternatively, one end of the temperature detection line may be electrically connected with the processor 1230, whereas an opposite end of the temperature detection line may not be electrically connected with the processor 1230. Furthermore, one end of the shape-changing material may be electrically grounded. FIG. 12 illustrates an equivalent circuit to the temperature detection circuit that includes the temperature detection line electrically connected with the processor 1230 at the one end thereof, the shape-changing material electrically grounded at the one end thereof, and the processor 1230.

Referring to FIG. 12, at least part of the shape-changing material may change in shape depending on a temperature change. For example, a distal end (e.g., the distal end 931) of the shape-changing material may have a straight-line shape substantially parallel to the temperature detection line at a temperature lower than a specified temperature and may be deformed to make contact with the temperature detection line (e.g., the temperature detection line 1020) at the specified temperature or higher.

According to an embodiment, in the structure in which the shape-changing material is disposed adjacent to the temperature detection line but is not electrically connected with the processor 1230 or is not electrically grounded (e.g., FIG. 8A), a characteristic value (e.g., resistance) of a detection line formed by the shape-changing material and the temperature detection line may vary depending on the contact between the shape-changing material and the temperature detection line. For example, in the state in which the shape-changing material does not make contact with the temperature detection line, the detection line may include only the temperature detection line to have a first characteristic value, and in the state in which the shape-changing material makes contact with the temperature detection line, the detection line may include the temperature detection line and the shape-changing material to have a second characteristic value. That is, as in the equivalent circuit illustrated in FIG. 6, the detection line may function similarly to the variable resistance 610, the characteristic value of which varies depending on the contact between the temperature detection line and the shape-changing material.

According to an embodiment, in the structure in which the shape-changing material is disposed adjacent to the temperature detection line and is electrically grounded at the one end thereof and the temperature detection line is electrically connected with the processor 1230 at the one end thereof (e.g., FIG. 8B), an electrical connection state of a detection line formed by the temperature detection line and the shape-changing material may be determined depending on the contact between the shape-changing material and the temperature detection line. That is, as in the equivalent circuit illustrated in FIG. 12, the detection line may function similarly to the switch circuit 1210, the electrical connection state of which is determined depending on the contact between the temperature detection line and the shape-changing material. For example, at a temperature lower than a specified temperature, the switch circuit 1210 may be in an open state in which the temperature detection line and the shape-changing material do not make contact with each other, and at the specified temperature or higher, the switch circuit 1210 may be in a short-circuit state in which the temperature detection line and the shape-changing material make contact with each other.

According to an embodiment of the present disclosure, the processor 1230 may identify the non-contact state and the contact state of the shape-changing material using continuous values and may perform processing on the continuous values. Furthermore, a plurality of contact switch blocks, the shape of which varies depending on a temperature change, may be implemented in consideration of an implemented path.

According to an embodiment of the present disclosure, the processor 1230 may detect the contact between the shape-changing material and the temperature detection line through an OP AMP included in the processor 1230. According to an embodiment of the present disclosure, through the OP AMP, the processor 1230 may also detect a consistent and continuous change, as well as whether the shape-changing material makes contact with the temperature detection line. According to an embodiment, the OP AMP may be included in the processor 1230 or may be configured separately from the processor 1230.

According to an embodiment, a plurality of shape-changing materials may be disposed in different areas so as to be adjacent to the temperature detection line. In this case, the number of shape-changing materials making contact with the temperature detection line may vary depending on a temperature change. For example, when temperature rises from a first temperature to a second temperature, n shape-changing materials may make contact with the temperature detection line, and if temperature additionally rises from the second temperature to a third temperature, m shape-changing materials (m being larger than n) may make contact with the temperature detection line. Accordingly, a characteristic value of a detection line formed by the shape-changing materials and the temperature detection line may vary depending on the number of shape-changing materials making contact with the temperature detection line. In another example, when the temperature of the battery locally rises, the shape-changing material adjacent to or overlapping the portion of the battery in which temperature rises, among the plurality of shape-changing materials, may make contact with the temperature detection line. Accordingly, the portion of the battery in which temperature rises may be identified by determining contact or non-contact of the shape-changing materials.

As described above, according to various example embodiments, an electronic device may include a substrate, a coil unit comprising a coil disposed on a specified area of the substrate to transmit or receive a signal, a first terminal, a second terminal, and a temperature sensor configured to detect temperature. The temperature sensor may be disposed in a wire form between the first terminal and the second terminal along at least part of a peripheral area of the substrate.

According to various example embodiments, the electronic device may further include a shape-memory alloy part disposed adjacent to at least one area of the temperature sensor, wherein at least one area of the shape-memory alloy part is deformed depending on a temperature change of the electronic device.

According to various example embodiments, the at least one area of the shape-memory alloy part may make contact with the at least one area of the temperature sensor in a case where the electronic device has a temperature higher than a specified temperature.

According to various example embodiments, the at least one area of the shape-memory alloy part may make contact with the at least one area of the temperature sensor in response to the temperature change of the electronic device.

According to various example embodiments, the electronic device may further include at least one stopper disposed between an area of the shape-memory alloy part and the temperature sensor. The at least one stopper may prevent the area of the shape-memory alloy part from making contact with the temperature sensor.

According to various example embodiments, the at least one stopper may include a plurality of stoppers, and the plurality of stoppers may be spaced apart from one another by a specified distance.

As described above, according to various example embodiments, an electronic device may include a housing, a battery disposed inside the housing, a printed circuit board disposed inside the housing, wherein a processor is mounted on the printed circuit board, a temperature sensor having a wire form and disposed adjacent to at least one surface of the battery and configured to detect temperature of the battery, circuitry electrically connected with the printed circuit board and configured to measure the detected temperature, and at least one contact terminal configured to electrically connect the temperature sensor and the circuitry.

According to various example embodiments, a characteristic value of the temperature sensor may vary depending on a temperature change of the battery, and the circuitry may measure the temperature of the battery on the basis of the characteristic value.

According to various example embodiments, the characteristic value may include a resistance value.

According to various example embodiments, the electronic device may further include a substrate overlapping one surface of the battery. The temperature sensor may be disposed on the substrate.

According to various example embodiments, the at least one contact terminal may be disposed on the substrate.

According to various example embodiments, the temperature sensor may be arranged along at least part of a peripheral area of the substrate.

According to various example embodiments, the electronic device may further include an antenna configured to transmit and receive a signal. The antenna may be disposed on a central area of the substrate.

According to various example embodiments, the electronic device may further include a shape-changing material disposed adjacent to at least one area of the temperature sensor. At least one area of the shape-changing material may be deformed depending on a temperature change.

According to various example embodiments, depending on the temperature of the battery, the shape-changing material may do not make contact with the temperature sensor at a temperature lower than a specified temperature and make contact with the temperature sensor at the specified temperature or higher.

According to various example embodiments, the circuitry may measure the temperature of the battery on the basis of a characteristic value determined depending on whether the temperature sensor and the shape-changing material make contact with each other.

According to various example embodiments, the shape-changing material may include a shape-memory alloy.

According to various example embodiments, the electronic device may further include at least one stopper disposed between an area of the shape-changing material and the temperature sensor. The at least one stopper may prevent the area of the shape-changing material from making contact with the temperature sensor.

According to various example embodiments, the at least one stopper may include a plurality of stoppers, and the plurality of stoppers may be spaced apart from one another by a specified distance.

According to various example embodiments, the electronic device may further include an antenna configured to transmit and receive a signal. The temperature sensor may be disposed outside the antenna.

Figure 13:
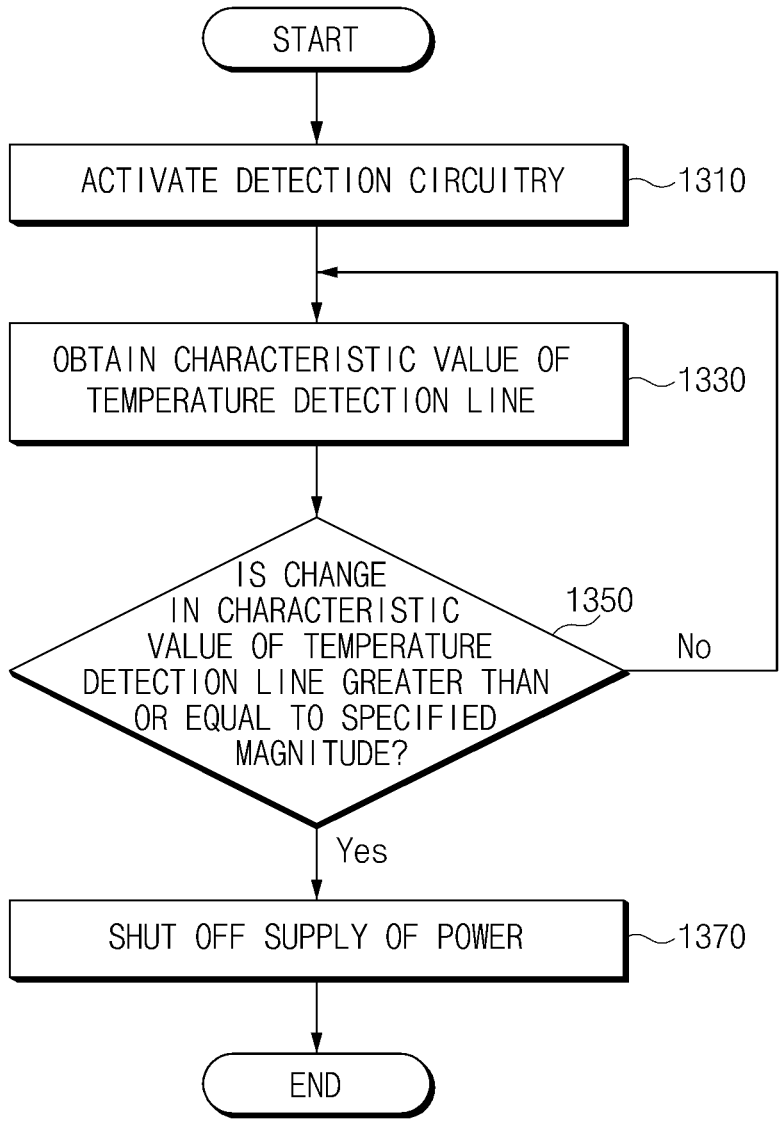
FIG. 13 is a flowchart illustrating an example method of operating an electronic device depending on a temperature change of a battery, according to an example embodiment of the present disclosure.

FIG. 13 is a flowchart illustrating an example method of operating an electronic device depending on a temperature change of a battery, according to an example embodiment of the present disclosure.

Referring to FIG. 13, in operation 1310, an electronic device (e.g., the electronic device 100) may activate detection circuitry (e.g., the antenna unit 170 or the temperature detection device 200). For example, the electronic device may apply current to the detection circuitry.

In operation 1330, the electronic device (e.g., the processor 660 or the processor 1230) may obtain a characteristic value of a temperature detection line (e.g., the temperature detection line 650) comprising the detection circuitry. For example, the electronic device may measure the resistance of the temperature detection line.

In operation 1350, the electronic device (e.g., the processor 660 or the processor 1230) may determine whether a change in the characteristic value of the temperature detection line is greater than or equal to a specified magnitude. For example, the electronic device may determine whether a change in the resistance of the temperature detection line is greater than or equal to the specified magnitude.

In the case where the change in the characteristic value of the temperature detection line is less than the specified magnitude, the electronic device may return to operation 1330 to obtain a characteristic value of the temperature detection line again. For example, the electronic device may consistently or periodically obtain the characteristic value of the temperature detection line.

In the case where the change in the characteristic value of the temperature detection line is greater than or equal to the specified magnitude, the electronic device (e.g., the processor 660 or the processor 1230) may, in operation 1370, shut off power supplied to/by a battery (e.g., the battery 160) of the electronic device. In an embodiment, the electronic device (e.g., the processor 660 or the processor 1230) may limit some functions of the electronic device in the case where the change in the characteristic value of the temperature detection line is greater than or equal to the specified magnitude. For example, the electronic device may not supply power to some of elements included in the electronic device. Accordingly, the electronic device may lower the temperature of the battery to manage the battery such that the battery temperature does not exceed a specified temperature.

According to an embodiment, the electronic device (e.g., the processor 660 or the processor 1230) may measure the temperature of the battery by determining whether the characteristic value of the temperature detection line, instead of the change in the characteristic value of the temperature detection line, is greater than or equal to a specified value. In another example, the electronic device (e.g., the processor 660 or the processor 1230) may determine a temperature change of the battery by detecting whether a shape-changing material included in the detection circuitry makes contact with the temperature detection line.

Figure 14:
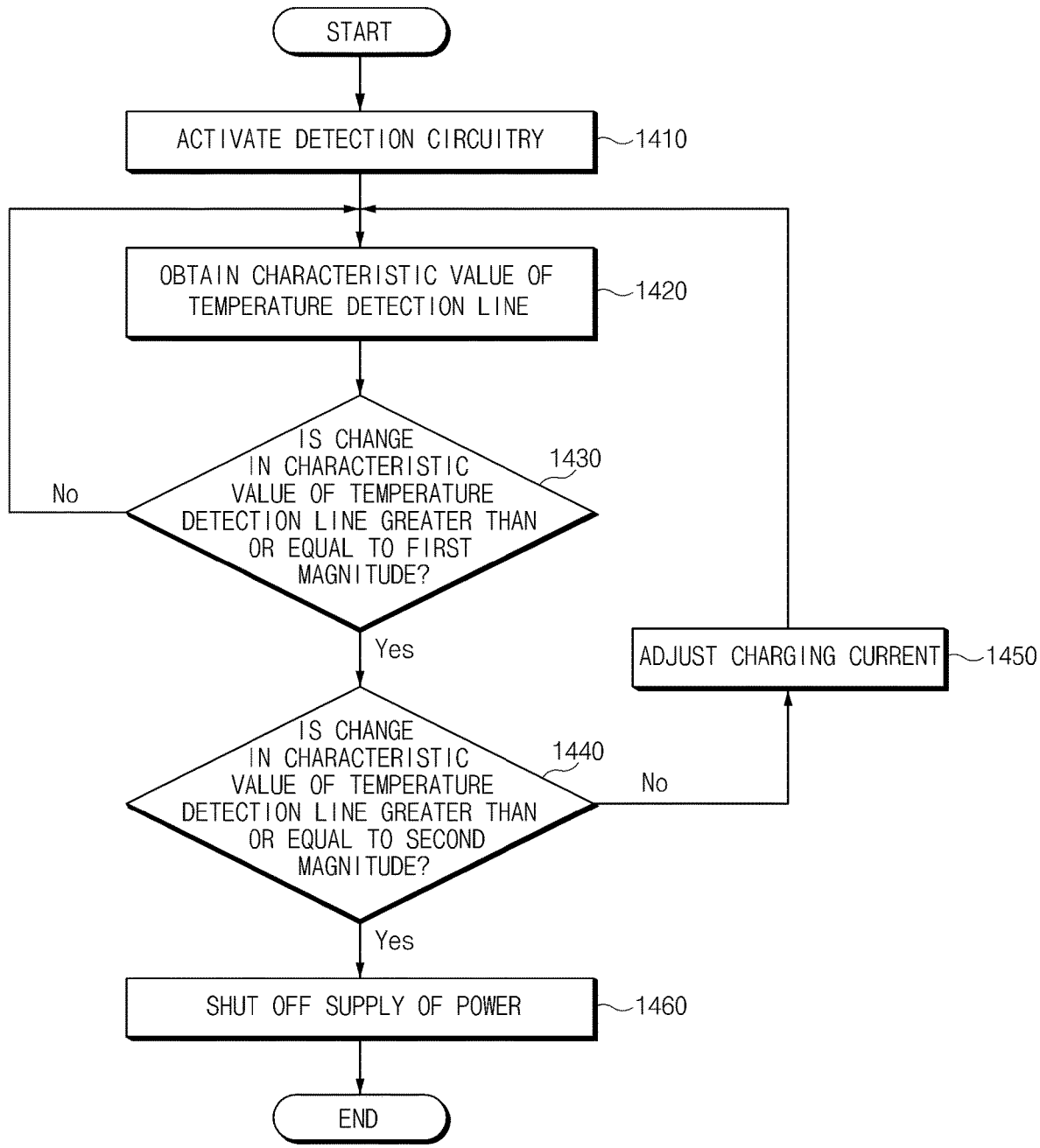
FIG. 14 is a flowchart illustrating another example method of operating an electronic device depending on a temperature change of a battery, according to an example embodiment of the present disclosure.

FIG. 14 is a flowchart illustrating another example method of operating an electronic device depending on a temperature change of a battery, according to an example embodiment of the present disclosure.

According to various embodiments, if the temperature of a battery (e.g., the battery 160) is higher than or equal to a specified value, an electronic device (e.g., the electronic device 100) may immediately shut off power supplied to/by the battery, as in FIG. 13, and may correspond to a temperature change of the battery in stages, as in FIG. 14.

Referring to FIG. 14, in operation 1410, the electronic device (e.g., the processor 660 or the processor 1230) may activate a detection circuitry (e.g., the antenna unit 170 or the temperature detection device 200). For example, the electronic device may apply current to the detection circuitry.

In operation 1420, the electronic device (e.g., the processor 660 or the processor 1230) may obtain a characteristic value of a temperature detection line constituting the detection circuitry. For example, the electronic device may measure the resistance of the temperature detection line.

In operation 1430, the electronic device (e.g., the processor 660 or the processor 1230) may determine whether a change in the characteristic value of the temperature detection line is greater than or equal to a specified first magnitude. For example, the electronic device may determine whether a change in the resistance of the temperature detection line is greater than or equal to the specified first magnitude.

In the case where the change in the characteristic value of the temperature detection line is less than the specified first magnitude, the electronic device (e.g., the processor 660 or the processor 1230) may return to operation 1420 to obtain a characteristic value of the temperature detection line again. For example, the electronic device may consistently or periodically obtain the characteristic value of the temperature detection line.

In the case where the change in the characteristic value of the temperature detection line is greater than or equal to the specified first magnitude, the electronic device (e.g., the processor 660 or the processor 1230) may, in operation 1440, determine whether the change in the characteristic value of the temperature detection line is greater than or equal to a specified second magnitude. For example, the electronic device may determine whether a change in the resistance of the temperature detection line is greater than or equal to the specified second magnitude.

In the case where the change in the characteristic value of the temperature detection line is less than the specified second magnitude (e.g., in the case where the change in the characteristic value of the temperature detection line is greater than or equal to the first magnitude and is less than the second magnitude), the electronic device (e.g., the processor 660 or the processor 1230) may, in operation 1450, adjust charging current of the battery. For example, the electronic device may adjust the amount of current applied to the battery. Furthermore, the electronic device (e.g., the processor 660 or the processor 1230) may adjust charging current of the battery and may return to operation 1420 to consistently or periodically monitor a temperature change of the battery.

In the case where the change in the characteristic value of the temperature detection line is greater than or equal to the specified second magnitude, the electronic device (e.g., the processor 660 or the processor 1230) may, in operation 1460, shut off power supplied to/by the battery.

According to various embodiments, the electronic device (e.g., the processor 660 or the processor 1230) may limit some functions of the electronic device in the case where the change in the characteristic value of the temperature detection line is greater than or equal to the first magnitude and is less than the second magnitude, and may limit most of the functions of the electronic device in the case where the change in the characteristic value of the temperature detection line is greater than or equal to the second magnitude. For example, in the case where the electronic device (e.g., the processor 660 or the processor 1230) is a device that supports a telephone call function, the electronic device may limit the use of functions other than the telephone call function, or may decrease the brightness of a display.

According to an embodiment, the electronic device (e.g., the processor 660 or the processor 1230) may measure the temperature of the battery by determining whether the characteristic value of the temperature detection line, instead of the change in the characteristic value of the temperature detection line, is greater than or equal to a specified value. In another example, the electronic device (e.g., the processor 660 or the processor 1230) may determine a temperature change of the battery by detecting whether a shape-changing material included in the detection circuitry makes contact with the temperature detection line.

According to an embodiment, the electronic device (e.g., the processor 660 or the processor 1230) may activate the detection circuitry if a specified event occurs. The specified event may occur, for example, at the time when it is determined that the battery is more likely to be overheated. For example, the specified event may occur when charging, drop impact, flooding, or general heat generation of the electronic device is detected. The electronic device (e.g., the processor 660 or the processor 1230) may monitor the resistance of the temperature detection line through the activated detection circuitry. Furthermore, if the resistance is higher than or equal to a threshold, the electronic device (e.g., the processor 660 or the processor 1230) may continue to perform an existing operation, and if not, the electronic device may shut off supply of power and may notify of the risk. For example, the electronic device (e.g., the processor 660 or the processor 1230) may display an alert message on a screen of a display, may output an alert sound through a speaker, may allow the display to emit a specific color of light, may allow an LED to emit light, or may provide a notification to a surrounding device connected thereto. In addition, the electronic device (e.g., the processor 660 or the processor 1230) may determine whether the event continues (e.g., whether a charger is disconnected, whether a predetermined period of time has elapsed after drop impact, or whether heat is not generated) and may deactivate the detection circuitry if the event is completed.

Figure 15:
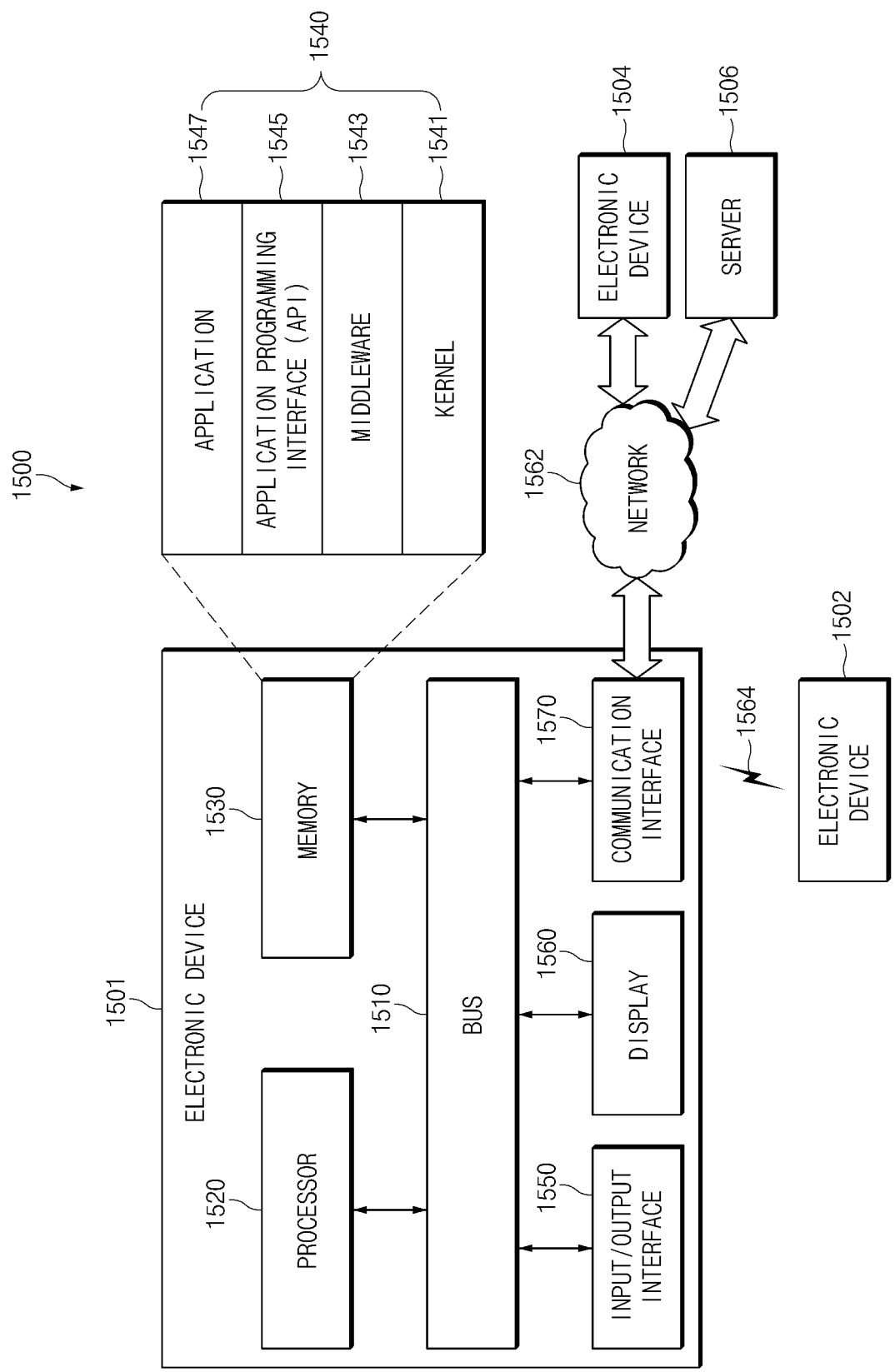
FIG. 15 is a diagram illustrating an example electronic device in a network environment according to an example embodiment of the present disclosure.

FIG. 15 is a diagram illustrating an example electronic device in a network environment according to an example embodiment of the present disclosure. The electronic device 1501 illustrated in FIG. 15 may include a part or the entirety of the electronic device 100 illustrated in FIG. 1.

An electronic device 1501 in a network environment 1500 according to various embodiments of the present disclosure will be described with reference to FIG. 15. The electronic device 1501 may include a bus 1510, a processor (e.g., including processing circuitry) 1520, a memory 1530, an input/output interface (e.g., including input/output interface circuitry) 1550, a display 1560, and a communication interface (e.g., including communication circuitry) 1570. In various embodiments of the present disclosure, at least one of the foregoing elements may be omitted or another element may be added to the electronic device 1501.

The bus 1510 may include a circuit for connecting the above-mentioned elements 1510 to 1570 to each other and transferring communications (e.g., control messages and/or data) among the above-mentioned elements.

The processor 1520 may include various processing circuitry, such as, for example, and without limitation, at least one of a dedicated processor, a central processing unit (CPU), an application processor (AP), or a communication processor (CP), or the like. The processor 1520 may perform data processing or an operation related to communication and/or control of at least one of the other elements of the electronic device 1501.

The memory 1530 may include a volatile memory and/or a nonvolatile memory. The memory 1530 may store instructions or data related to at least one of the other elements of the electronic device 1501. According to an embodiment of the present disclosure, the memory 1530 may store software and/or a program 1540. The program 1540 may include, for example, a kernel 1541, a middleware 1543, an application programming interface (API) 1545, and/or an application program (or an application) 1547. At least a portion of the kernel 1541, the middleware 1543, or the API 1545 may be referred to as an operating system (OS).

The kernel 1541 may control or manage system resources (e.g., the bus 1510, the processor 1520, the memory 1530, or the like) used to perform operations or functions of other programs (e.g., the middleware 1543, the API 1545, or the application program 1547). Furthermore, the kernel 1541 may provide an interface for allowing the middleware 1543, the API 1545, or the application program 1547 to access individual elements of the electronic device 1501 in order to control or manage the system resources.

The middleware 1543 may serve as an intermediary so that the API 1545 or the application program 1547 communicates and exchanges data with the kernel 1541.

Furthermore, the middleware 1543 may handle one or more task requests received from the application program 1547 according to a priority order. For example, the middleware 1543 may assign at least one application program 1547 a priority for using the system resources (e.g., the bus 1510, the processor 1520, the memory 1530, or the like) of the electronic device 1501. For example, the middleware 1543 may handle the one or more task requests according to the priority assigned to the at least one application, thereby performing scheduling or load balancing with respect to the one or more task requests.

The API 1545, which is an interface for allowing the application 1547 to control a function provided by the kernel 1541 or the middleware 1543, may include, for example, at least one interface or function (e.g., instructions) for file control, window control, image processing, character control, or the like.

The input/output interface 1550 may include various input/output circuitry and serve to transfer an instruction or data input from a user or another external device to (an)other element(s) of the electronic device 1501. Furthermore, the input/output interface 1550 may output instructions or data received from (an)other element(s) of the electronic device 1501 to the user or another external device.

The display 1560 may include, for example, a liquid crystal display (LCD), a light-emitting diode (LED) display, an organic light-emitting diode (OLED) display, a microelectromechanical systems (MEMS) display, or an electronic paper display, or the like. The display 1560 may present various content (e.g., a text, an image, a video, an icon, a symbol, or the like) to the user. The display 1560 may include a touch screen, and may receive a touch, gesture, proximity or hovering input from an electronic pen or a part of a body of the user.

The communication interface 1570 may include various communication circuitry and set communications between the electronic device 1501 and an external device (e.g., a first external electronic device 1502, a second external electronic device 1504, or a server 1506). For example, the communication interface 1570 may be connected to a network 1562 via wireless communications or wired communications so as to communicate with the external device (e.g., the second external electronic device 1504 or the server 1506).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 1564. The short-range communications may include at least one of wireless fidelity (Wi-Fi), Bluetooth, near field communication (NFC), magnetic stripe transmission (MST), or GNSS.

The MST may generate pulses according to transmission data and the pulses may generate electromagnetic signals. The electronic device 1501 may transmit the electromagnetic signals to a reader device such as a POS (point of sales) device. The POS device may detect the magnetic signals by using a MST reader and restore data by converting the detected electromagnetic signals into electrical signals.

The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 232 (RS-232), plain old telephone service (POTS), or the like. The network 1562 may include at least one of telecommunications networks, for example, a computer network (e.g., local area network (LAN) or wide area network (WAN)), the Internet, or a telephone network.

The types of the first external electronic device 1502 and the second external electronic device 1504 may be the same as or different from the type of the electronic device 1501. According to an embodiment of the present disclosure, the server 1506 may include a group of one or more servers. A portion or all of operations performed in the electronic device 1501 may be performed in one or more other electronic devices (e.g., the first electronic device 1502, the second external electronic device 1504, or the server 1506). When the electronic device 1501 should perform a certain function or service automatically or in response to a request, the electronic device 1501 may request at least a portion of functions related to the function or service from another device (e.g., the first electronic device 1502, the second external electronic device 1504, or the server 1506) instead of or in addition to performing the function or service for itself. The other electronic device (e.g., the first electronic device 1502, the second external electronic device 1504, or the server 1506) may perform the requested function or additional function, and may transfer a result of the performance to the electronic device 1501. The electronic device 1501 may use a received result itself or additionally process the received result to provide the requested function or service. To this end, for example, a cloud computing technology, a distributed computing technology, or a client-server computing technology may be used.

Figure 16:
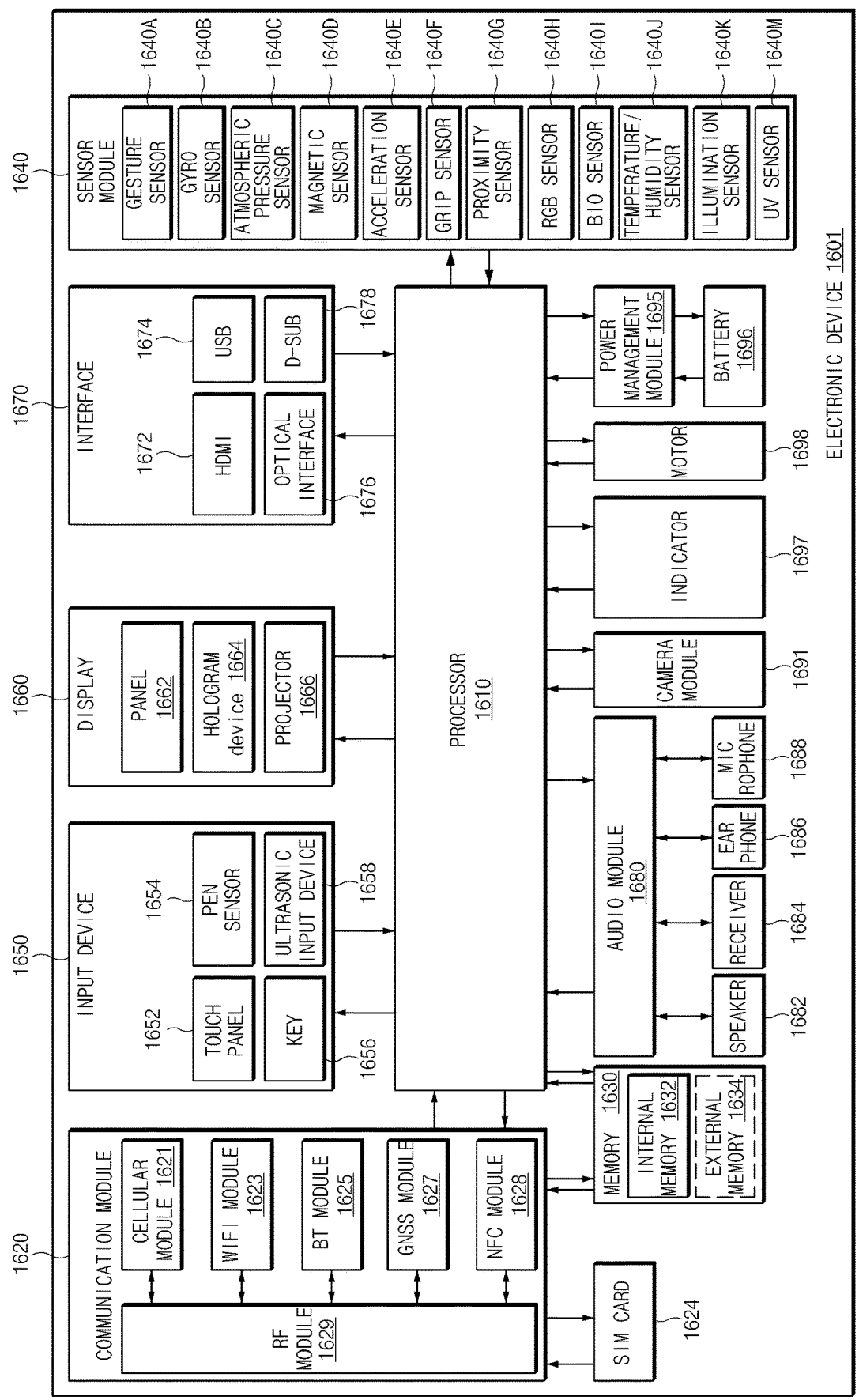
FIG. 16 is a block diagram illustrating an example electronic device according to an example embodiment of the present disclosure.

FIG. 16 is a block diagram illustrating an example electronic device according to an example embodiment of the present disclosure.

Referring to FIG. 16, an electronic device 1601 may include, for example, a part or the entirety of the electronic device 100 illustrated in FIG. 1 or the electronic device 1501 illustrated in FIG. 15. The electronic device 1601 may include at least one processor (e.g., AP) (e.g., including processing circuitry) 1610, a communication module (e.g., including communication circuitry) 1620, a subscriber identification module (SIM) 1624, a memory 1630, a sensor module 1640, an input device (e.g., including input circuitry) 1650, a display 1660, an interface (e.g., including interface circuitry) 1670, an audio module 1680, a camera module 1691, a power management module 1695, a battery 1696, an indicator 1697, and a motor 1698.

The processor 1610 may include various processing circuitry and run an operating system or an application program so as to control a plurality of hardware or software elements connected to the processor 1610, and may process various data and perform operations. The processor 1610 may be implemented with, for example, a system on chip (SoC). According to an embodiment of the present disclosure, the processor 1610 may further include a graphic processing unit (GPU) and/or an image signal processor. The processor 1610 may include at least a portion (e.g., a cellular module 1621) of the elements illustrated in FIG. 16. The processor 1610 may load, on a volatile memory, an instruction or data received from at least one of other elements (e.g., a nonvolatile memory) to process the instruction or data, and may store various data in a nonvolatile memory.

The communication module 1620 may have a configuration that is the same as or similar to that of the communication interface 1570 of FIG. 15. The communication module 1620 may include, various communication circuitry, such as, for example, and without limitation, one or more of a cellular module 1621, a Wi-Fi module 1623, a Bluetooth (BT) module 1625, a GNSS module 1627 (e.g., a GPS module, a GLONASS module, a BeiDou module, or a Galileo module), a NFC module 1628, and a radio frequency (RF) module 1629, or the like.

The cellular module 1621 may provide, for example, a voice call service, a video call service, a text message service, or an Internet service through a communication network. The cellular module 1621 may identify and authenticate the electronic device 1601 in the communication network using the subscriber identification module 1624 (e.g., a SIM card). The cellular module 1621 may perform at least a part of functions that may be provided by the processor 1610. The cellular module 1621 may include a communication processor (CP).

Each of the Wi-Fi module 1623, the Bluetooth module 1625, the GNSS module 1627 and the NFC module 1628 may include, for example, a processor for processing data transmitted/received through the modules. According to some various embodiments of the present disclosure, at least a part (e.g., two or more) of the cellular module 1621, the Wi-Fi module 1623, the Bluetooth module 1625, the GNSS module 1627, and the NFC module 1628 may be included in a single integrated chip (IC) or IC package.

The RF module 1629 may transmit/receive, for example, communication signals (e.g., RF signals). The RF module 1629 may include, for example, a transceiver, a power amp module (PAM), a frequency filter, a low noise amplifier (LNA), an antenna, or the like. According to another embodiment of the present disclosure, at least one of the cellular module 1621, the Wi-Fi module 1623, the Bluetooth module 1625, the GNSS module 1627, or the NFC module 1628 may transmit/receive RF signals through a separate RF module.

The SIM 1624 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 1630 (e.g., the memory 1530) may include, for example, an internal memory 1632 and/or an external memory 1634. The internal memory 1632 may include at least one of a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 1634 may include a flash drive such as a compact flash (CF), a secure digital (SD), a Micro-SD, a Mini-SD, an extreme digital (xD), a MultiMediaCard (MMC), a memory stick, or the like. The external memory 1634 may be operatively and/or physically connected to the electronic device 1601 through various interfaces.

The sensor module 1640 may, for example, measure physical quantity or detect an operation state of the electronic device 1601 and convert measured or detected information into an electrical signal. The sensor module 1640 may include, for example, at least one of a gesture sensor 1640A, a gyro sensor 1640B, a barometric (e.g., atmospheric) pressure sensor 1640C, a magnetic sensor 1640D, an acceleration sensor 1640E, a grip sensor 1640F, a proximity sensor 1640G, a color sensor 1640H (e.g., a red/green/blue (RGB) sensor), a biometric (e.g., bio) sensor 1640I, a temperature/humidity sensor 1640J, an illumination sensor 1640K, and/or an ultraviolet (UV) sensor 1640M, or the like. Additionally or alternatively, the sensor module 1640 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1640 may further include a control circuit for controlling at least one sensor included therein. In some various embodiments of the present disclosure, the electronic device 1601 may further include a processor configured to control the sensor module 1640 as a part of the processor 1610 or separately, so that the sensor module 1640 is controlled while the processor 1610 is in a sleep state.

The input device 1650 may include various input circuitry, such as, for example, and without limitation, one or more of a touch panel 1652, a (digital) pen sensor 1654, a key 1656, or an ultrasonic input device 1658, or the like. The touch panel 1652 may employ at least one of capacitive, resistive, infrared, and ultrasonic sensing methods. The touch panel 1652 may further include a control circuit. The touch panel 1652 may further include a tactile layer so as to provide a haptic feedback to a user.

The (digital) pen sensor 1654 may include, for example, a sheet for recognition which is a part of a touch panel or is separate. The key 1656 may include, for example, a physical button, an optical button, or a keypad. The ultrasonic input device 1658 may sense ultrasonic waves generated by an input tool through a microphone 1688 so as to identify data corresponding to the ultrasonic waves sensed.

The display 1660 (e.g., the display 1560) may include a panel 1662, a hologram device 1664, or a projector 1666. The panel 1662 may have a configuration that is the same as or similar to that of the display 1560 of FIG. 15. The panel 1662 may be, for example, flexible, transparent, or wearable. The panel 1662 and the touch panel 1652 may be integrated into a single module. The hologram device 1664 may display a stereoscopic image in a space using a light interference phenomenon. The projector 1666 may project light onto a screen so as to display an image. The screen may be disposed in the inside or the outside of the electronic device 1601. According to an embodiment of the present disclosure, the display 1660 may further include a control circuit for controlling the panel 1662, the hologram device 1664, or the projector 1666.

The interface 1670 may include various interface circuitry, such as, for example, and without limitation, one or more of an HDMI 1672, a USB 1674, an optical interface 1676, or a D-subminiature (D-sub) 1678, or the like. The interface 1670, for example, may be included in the communication interface 1570 illustrated in FIG. 15. Additionally or alternatively, the interface 1670 may include, for example, a mobile high-definition link (MHL) interface, an SD card/multi-media card (MMC) interface, or an infrared data association (IrDA) interface.

The audio module 1680 may convert, for example, a sound into an electrical signal or vice versa. At least a portion of elements of the audio module 1680 may be included in the input/output interface 1550 illustrated in FIG. 15. The audio module 1680 may process sound information input or output through a speaker 1682, a receiver 1684, an earphone 1686, or the microphone 1688.

The camera module 1691 is, for example, a device for shooting a still image or a video. According to an embodiment of the present disclosure, the camera module 1691 may include at least one image sensor (e.g., a front sensor or a rear sensor), a lens, an image signal processor (ISP), or a flash (e.g., an LED or a xenon lamp).

The power management module 1695 may manage power of the electronic device 1601. According to an embodiment of the present disclosure, the power management module 1695 may include a power management integrated circuit (PMIC), a charger integrated circuit (IC), or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1696 and a voltage, current or temperature thereof while the battery is charged. The battery 1696 may include, for example, a rechargeable battery and/or a solar battery.

The indicator 1697 may display a specific state of the electronic device 1601 or a part thereof (e.g., the processor 1610), such as a booting state, a message state, a charging state, or the like. The motor 1698 may convert an electrical signal into a mechanical vibration, and may generate a vibration or haptic effect. Although not illustrated, a processing device (e.g., a GPU) for supporting a mobile TV may be included in the electronic device 1601. The processing device for supporting a mobile TV may process media data according to the standards of digital multimedia broadcasting (DMB), digital video broadcasting (DVB), MediaFLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

The term "module" used herein may refer, for example, to a unit including one of hardware, software and firmware or any combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include, for example, and without limitation, at least one of a dedicated processor, a CPU, an application-specific integrated circuit (ASIC) chip, a field-programmable gate array (FPGA), and a programmable-logic device for performing some operations, or the like, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor, the processor may perform functions corresponding to the instructions.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been illustrated and described with reference to various example embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a housing;
a battery disposed inside the housing;
a printed circuit board disposed inside the housing, including a processor mounted on the printed circuit board;
a temperature sensor having a wire form and disposed adjacent to at least one surface of the battery and configured to detect temperature of the battery;
circuitry electrically connected with the printed circuit board and configured to measure the detected temperature;
at least one contact terminal configured to electrically connect the temperature sensor and the circuitry; and
a shape-changing material disposed adjacent to at least one area of the temperature sensor,
wherein at least one portion of the shape-changing material is configured to be deformed depending on a temperature change.

2. The electronic device of claim 1, further comprising:
a substrate overlapping one surface of the battery,
wherein the temperature sensor is disposed on the substrate.

3. The electronic device of claim 2, wherein the at least one contact terminal is disposed on the substrate.

4. The electronic device of claim 2, wherein the temperature sensor is arranged along at least part of a peripheral area of the substrate.

5. The electronic device of claim 2, further comprising:
an antenna configured to transmit and/or receive a signal, wherein the antenna is disposed substantially on a central area of the substrate.

6. The electronic device of claim 1, wherein the shape-changing material is configured to not make contact with the temperature sensor at a temperature less than a specified temperature and to make contact with the temperature sensor at the specified temperature or greater.

7. The electronic device of claim 6, wherein the circuitry is configured to measure the temperature of the battery based on a characteristic value determined based on whether the temperature sensor and the shape-changing material make contact with each other.

8. The electronic device of claim 1, wherein the shape-changing material comprises a shape-memory alloy.

9. The electronic device of claim 1, further comprising:
at least one stopper disposed between a portion of the shape-changing material and the temperature sensor,
wherein the at least one stopper is configured to prevent the portion of the shape-changing material from making contact with the temperature sensor.

10. The electronic device of claim 9, wherein the at least one stopper includes:
a plurality of stoppers, and
wherein the plurality of stoppers are spaced apart from one another by a specified distance.

11. The electronic device of claim 1, further comprising:
an antenna configured to transmit and receive a signal,
wherein the temperature sensor is disposed outside the antenna.

* * * * *